US012382037B2

(12) United States Patent
Zhao et al.

(10) Patent No.: US 12,382,037 B2
(45) Date of Patent: Aug. 5, 2025

(54) DECOUPLED TRANSFORM PARTITIONING

(71) Applicant: Tencent America LLC, Palo Alto, CA (US)

(72) Inventors: Xin Zhao, San Jose, CA (US); Liang Zhao, Sunnyvale, CA (US); Madhu Peringassery Krishna, Mountain View, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/564,566

(22) Filed: Dec. 29, 2021

(65) Prior Publication Data

US 2022/0286675 A1   Sep. 8, 2022

Related U.S. Application Data

(60) Provisional application No. 63/157,516, filed on Mar. 5, 2021.

(51) Int. Cl.
*H04N 19/119* (2014.01)
*H04N 19/13* (2014.01)
(Continued)

(52) U.S. Cl.
CPC .......... *H04N 19/119* (2014.11); *H04N 19/13* (2014.11); *H04N 19/159* (2014.11);
(Continued)

(58) Field of Classification Search
CPC .... H04N 19/119; H04N 19/13; H04N 19/159; H04N 19/176; H04N 19/186;
(Continued)

(56) References Cited

U.S. PATENT DOCUMENTS

2014/0294078 A1   10/2014   Seregin et al.
2016/0241876 A1   8/2016    Xu et al.
(Continued)

FOREIGN PATENT DOCUMENTS

| GB | 2505408 A | * | 3/2014 | ........... H04N 19/186 |
|----|-----------|---|--------|------------------------|
| KR | 20170077203 A | | 7/2017 | |
| WO | 2019210857 A1 | | 11/2019 | |

OTHER PUBLICATIONS

International Search Report and Written Opinion regarding PCT/US2022/012738 dated Apr. 15, 2022.
(Continued)

*Primary Examiner* — Matthew K Kwan
(74) *Attorney, Agent, or Firm* — Morgan, Lewis & Bockius LLP

(57) ABSTRACT

Methods, apparatus, and computer readable storage medium for transform block partitioning in video decoding. The method includes receiving, by a device, a coded video bitstream for a luma block and a chroma block, the luma block being co-located with the chroma block. The device includes a memory storing instructions and a processor in communication with the memory. The method also includes partitioning, by the device, the luma block to obtain a luma coding block partitioning tree; partitioning, by the device, the chroma block to obtain a chroma coding block partitioning tree; partitioning, by the device, a luma coding block from the luma coding block partitioning tree to obtain a plurality of luma transform blocks; and partitioning, by the
(Continued)

device, a chroma coding block from the chroma coding block partitioning tree to obtain at least one plurality of chroma transform blocks.

19 Claims, 20 Drawing Sheets

(51) Int. Cl.
  *H04N 19/159* (2014.01)
  *H04N 19/176* (2014.01)
  *H04N 19/186* (2014.01)
  *H04N 19/593* (2014.01)
  *H04N 19/61* (2014.01)
  *H04N 19/96* (2014.01)

(52) U.S. Cl.
  CPC ......... *H04N 19/176* (2014.11); *H04N 19/186* (2014.11); *H04N 19/593* (2014.11); *H04N 19/61* (2014.11); *H04N 19/96* (2014.11)

(58) Field of Classification Search
  CPC ...... H04N 19/593; H04N 19/61; H04N 19/96; H04N 19/122; G06T 9/40

USPC .................................................... 375/240.12
See application file for complete search history.

(56) References Cited

U.S. PATENT DOCUMENTS

| | | | |
|---|---|---|---|
| 2017/0244964 A1 | 8/2017 | Liu et al. | |
| 2017/0272750 A1* | 9/2017 | An | H04N 19/119 |
| 2018/0063528 A1 | 3/2018 | An et al. | |
| 2018/0288446 A1 | 10/2018 | An et al. | |
| 2020/0296367 A1* | 9/2020 | Pham Van | H04N 19/176 |
| 2020/0413059 A1* | 12/2020 | Han | H04N 19/124 |
| 2021/0289221 A1* | 9/2021 | Misra | H04N 19/96 |
| 2022/0159255 A1* | 5/2022 | Xu | H04N 19/593 |

OTHER PUBLICATIONS

Japanese Office Action with English translation regarding Patent application 2022-563423 dated Nov. 9, 2023.
Extended European Search Report regarding 22 761 935.0 dated Jun. 6, 2023.
Tencent Technology, Korean Office Action, KR Patent Application No. 10-2022-7037833, Jan. 2, 2024, 9 pgs.

* cited by examiner

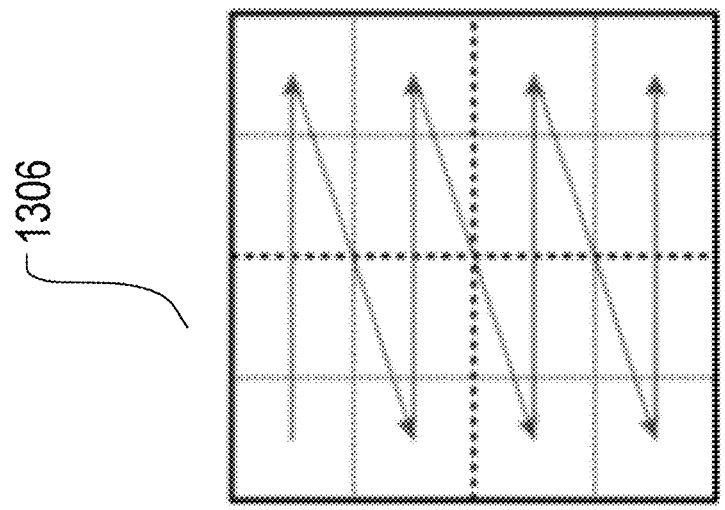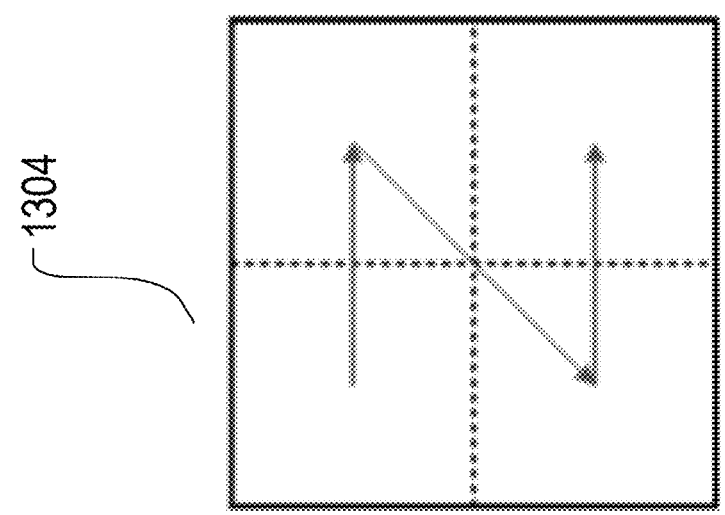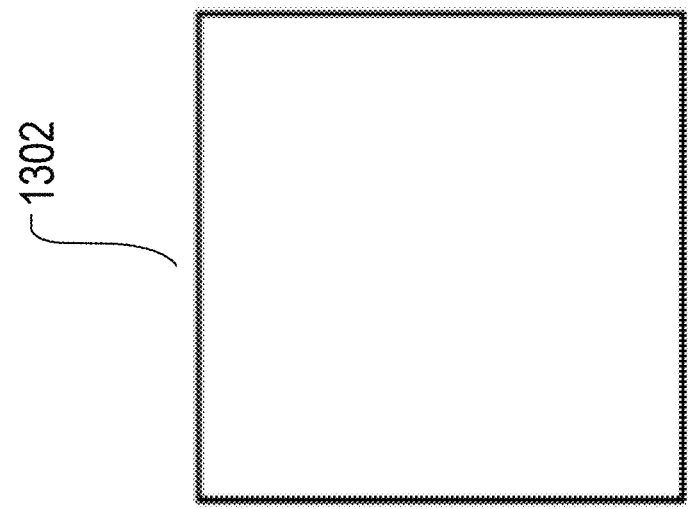
FIG. 13

DECOUPLED TRANSFORM PARTITIONING

RELATED APPLICATION

This application is a based on and claims the benefit of priority to U.S. Provisional Application No. 63/157,516 filed on Mar. 5, 2021, which is herein incorporated by reference in its entirety.

FIELD OF THE TECHNOLOGY

The present disclosure relates to video coding and/or decoding technologies, and in particular, to improved design and signaling of decoupled transform partitioning.

BACKGROUND OF THE DISCLOSURE

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or sub-sampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma subsampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

The present disclosure describes various embodiments of methods, apparatus, and computer-readable storage medium for video encoding and/or decoding.

According to one aspect, an embodiment of the present disclosure provides a method for transform block partitioning in video decoding. The method includes receiving, by a device, a coded video bitstream for a luma block and a chroma block, the luma block being co-located with the chroma block. The device includes a memory storing instructions and a processor in communication with the memory. The method also includes partitioning, by the device, the luma block to obtain a luma coding block partitioning tree; partitioning, by the device, the chroma block to obtain a chroma coding block partitioning tree; partitioning, by the device, a luma coding block from the luma coding block partitioning tree to obtain a plurality of luma transform blocks; and partitioning, by the device, a chroma coding block from the chroma coding block partitioning tree to obtain at least one plurality of chroma transform blocks.

According to another aspect, an embodiment of the present disclosure provides an apparatus for video encoding and/or decoding. The apparatus includes a memory storing instructions; and a processor in communication with the memory. When the processor executes the instructions, the processor is configured to cause the apparatus to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings.

FIG. 13 shows a scheme for partitioning a coding block into multiple transform blocks and coding order of the transform blocks according to example embodiments of the disclosure.

DETAILED DESCRIPTION OF THE DISCLOSURE

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1A:
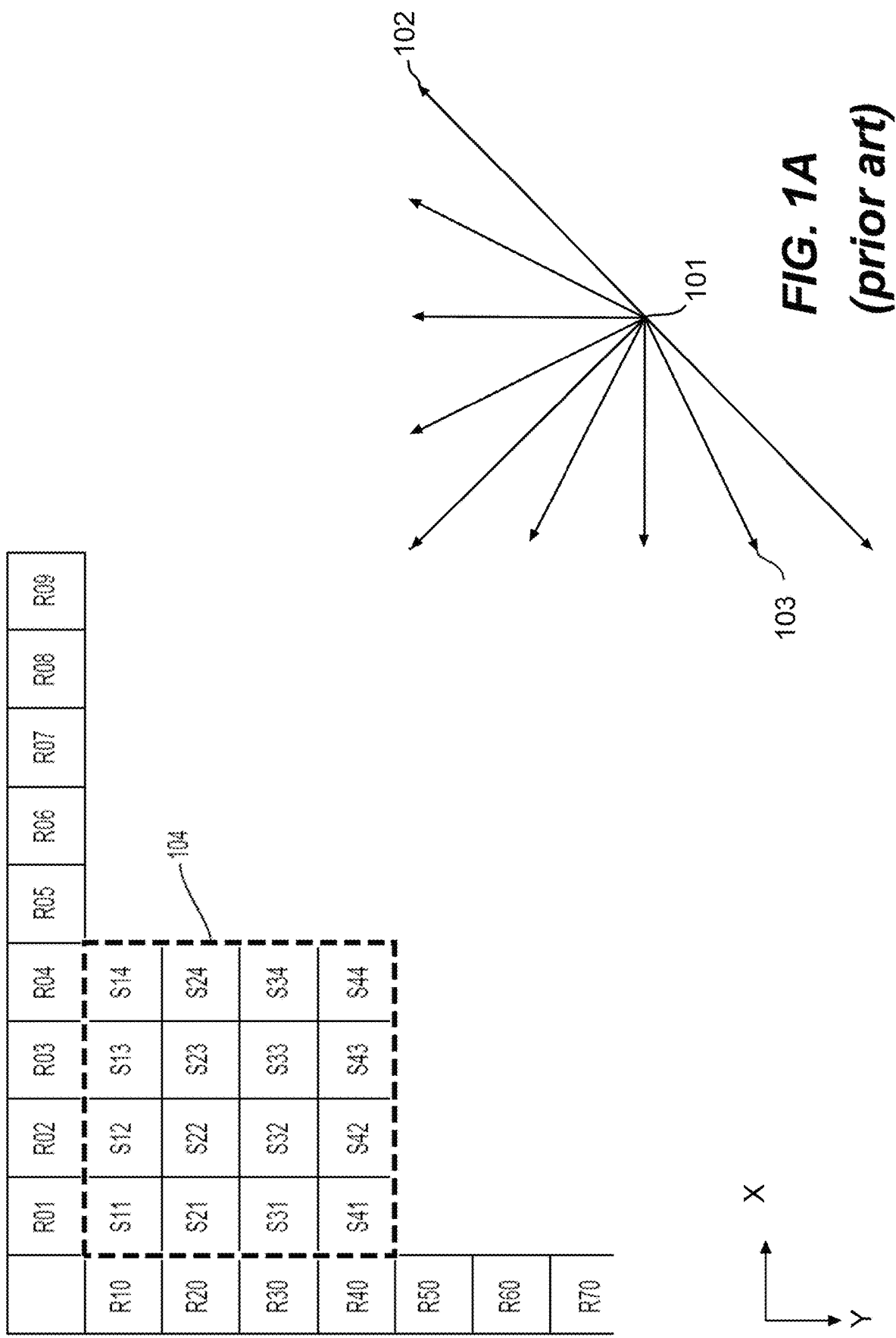
FIG. 1A shows a schematic illustration of an exemplary subset of intra prediction directional modes.
Figure 1B:
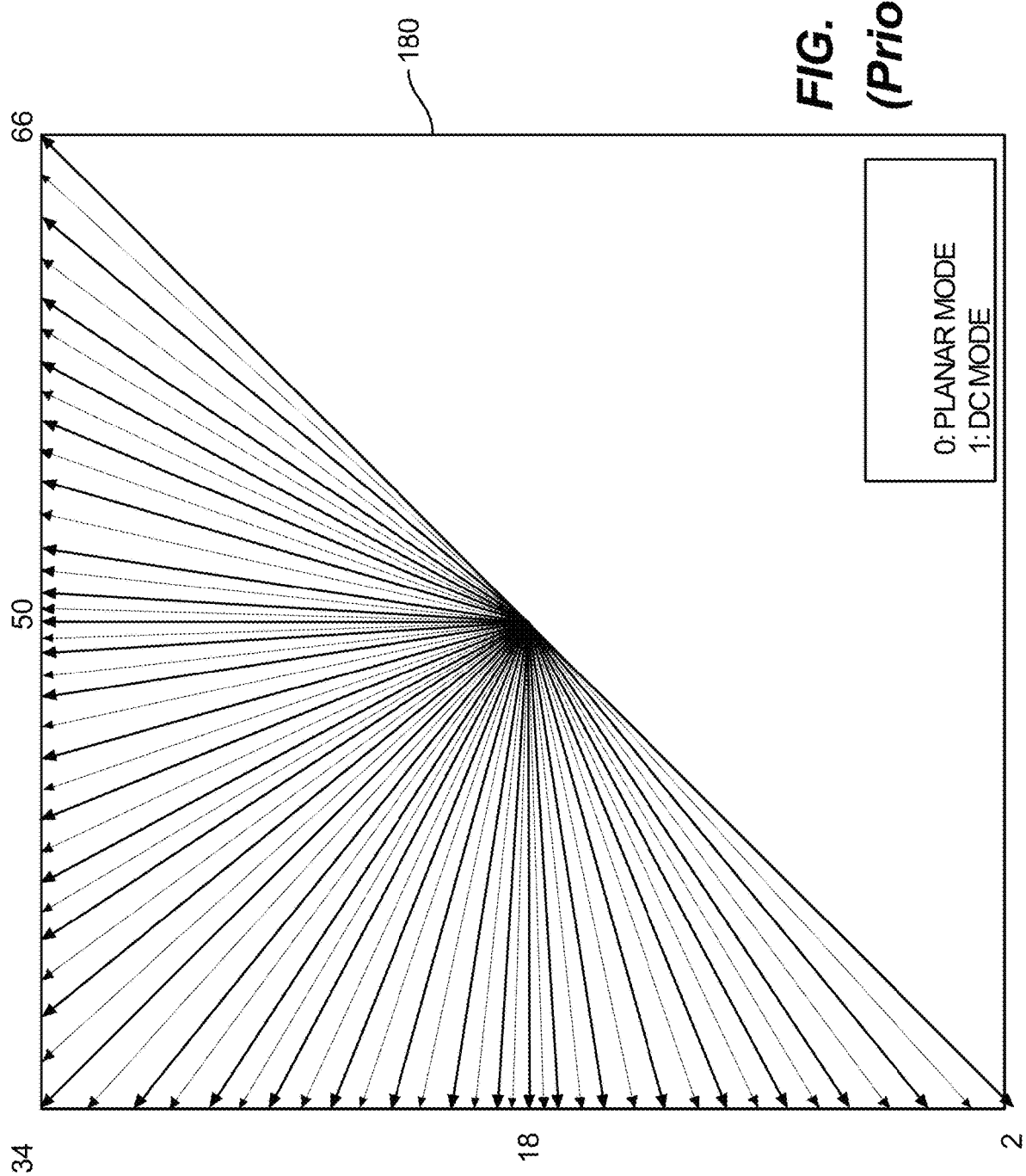
FIG. 1B shows an illustration of exemplary intra prediction directions.
Figure 2:
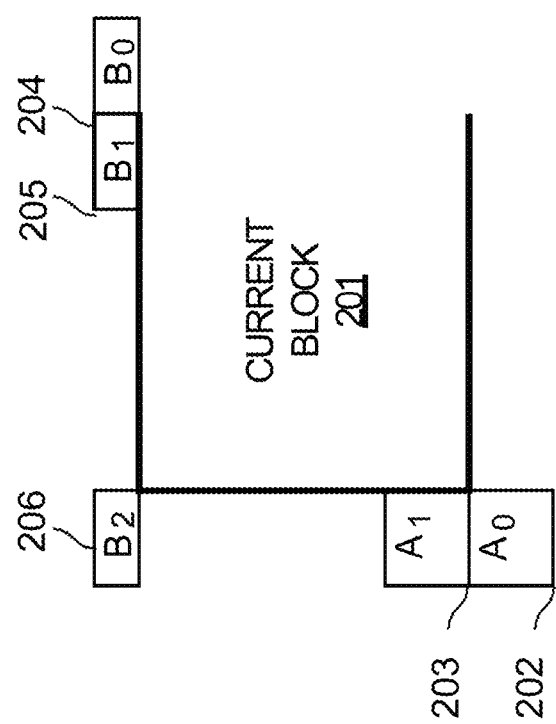
FIG. 2 shows a schematic illustration of a current block and its surrounding spatial merge candidates for motion vector prediction in one example.
Figure 3:
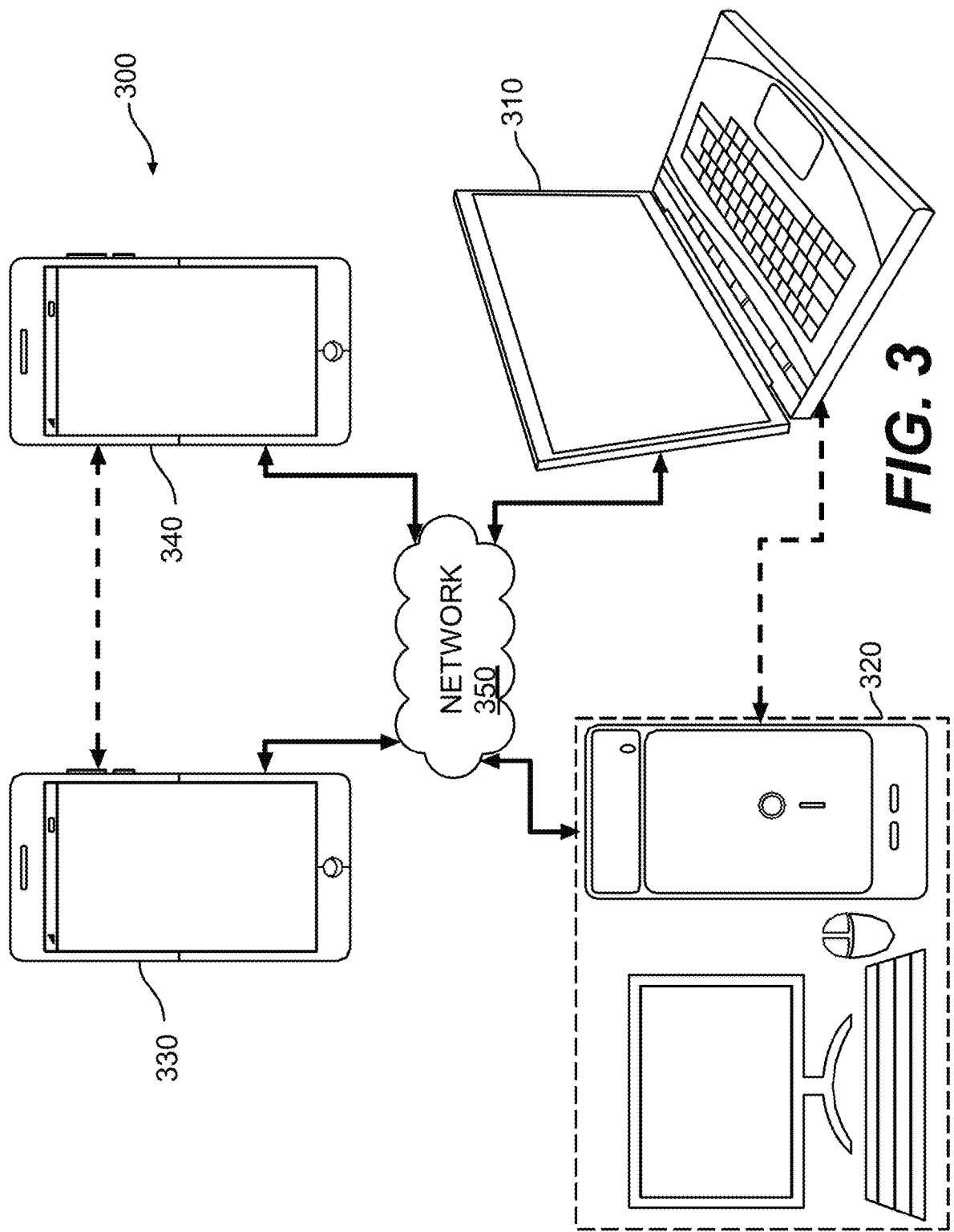
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350) may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
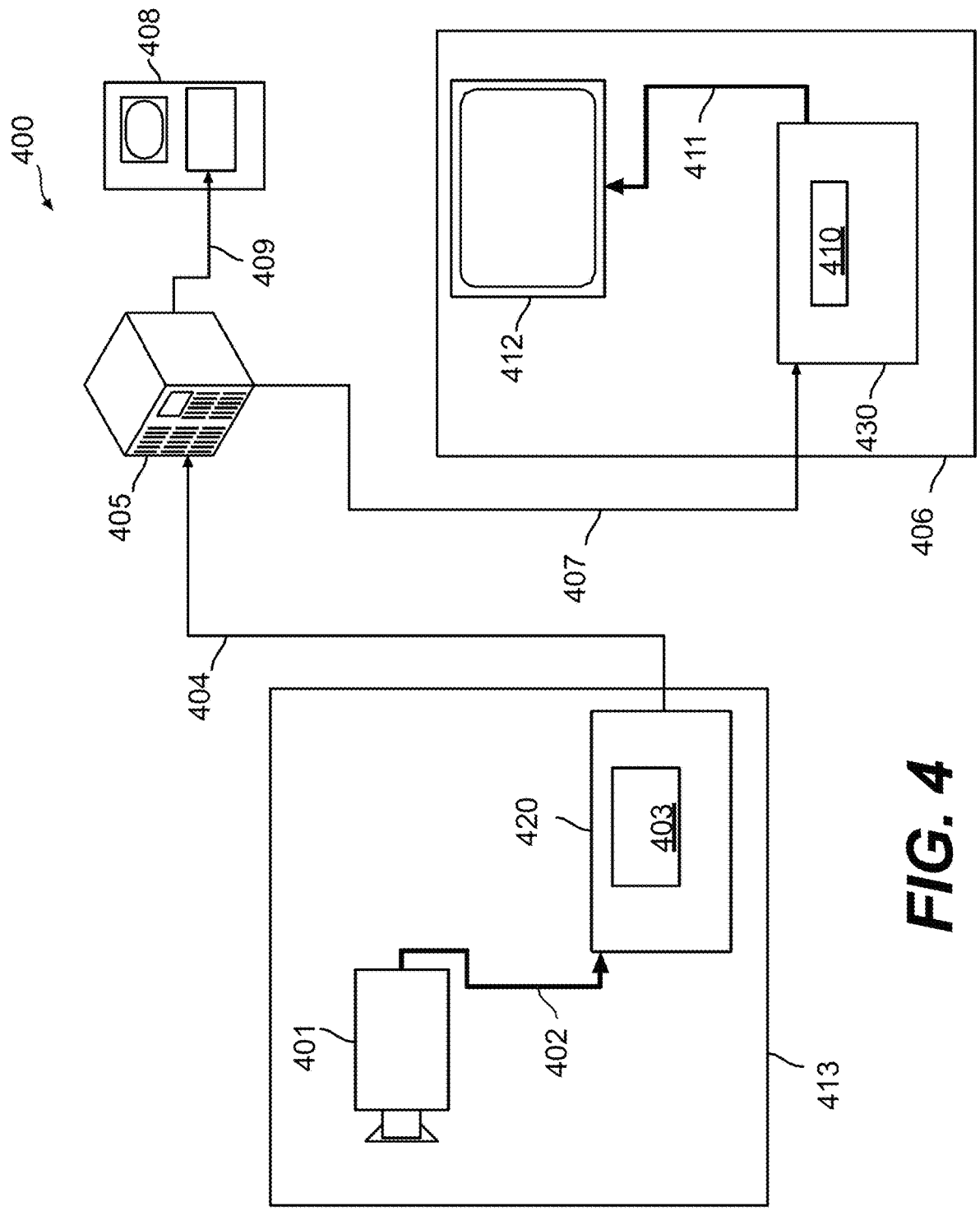
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
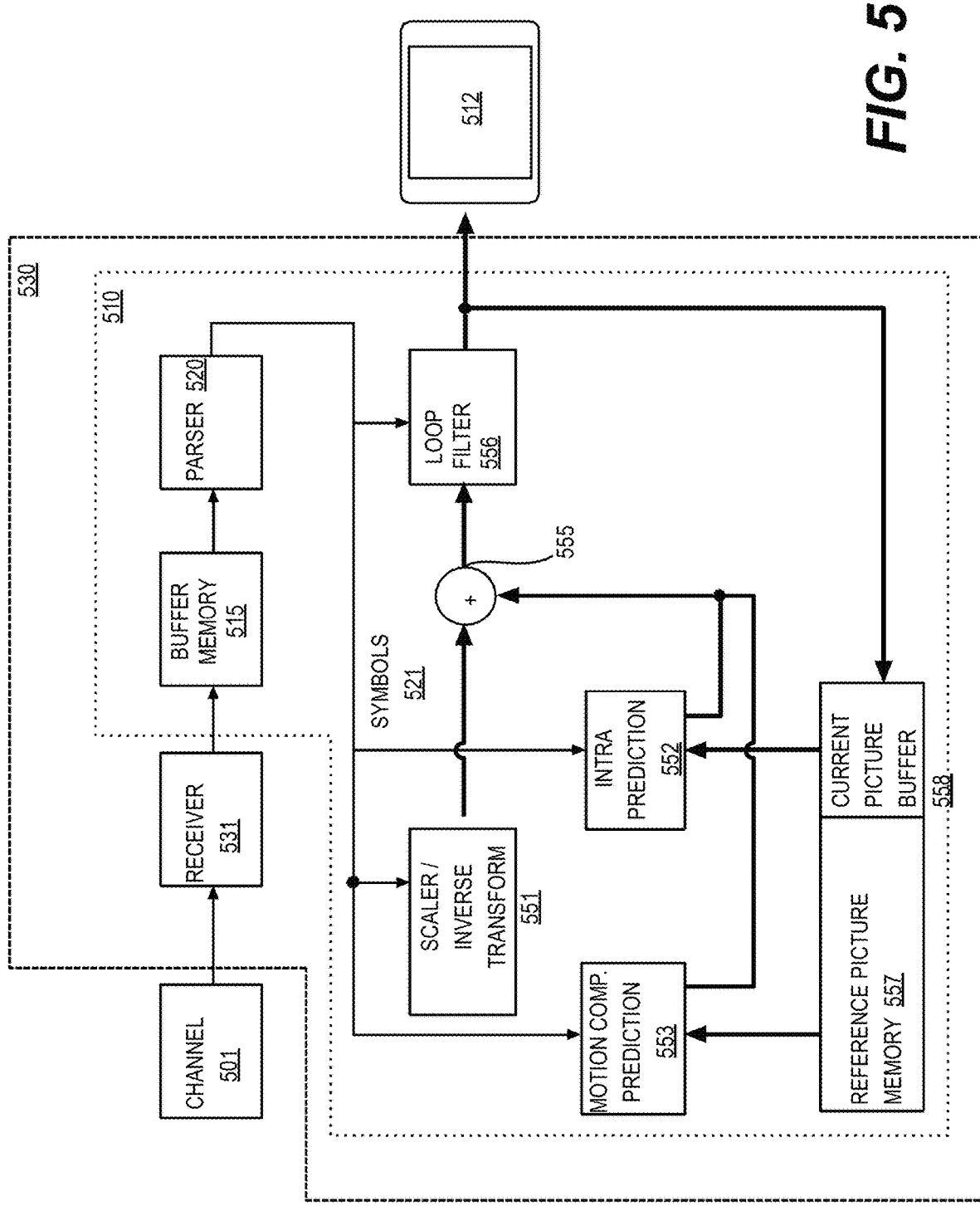
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
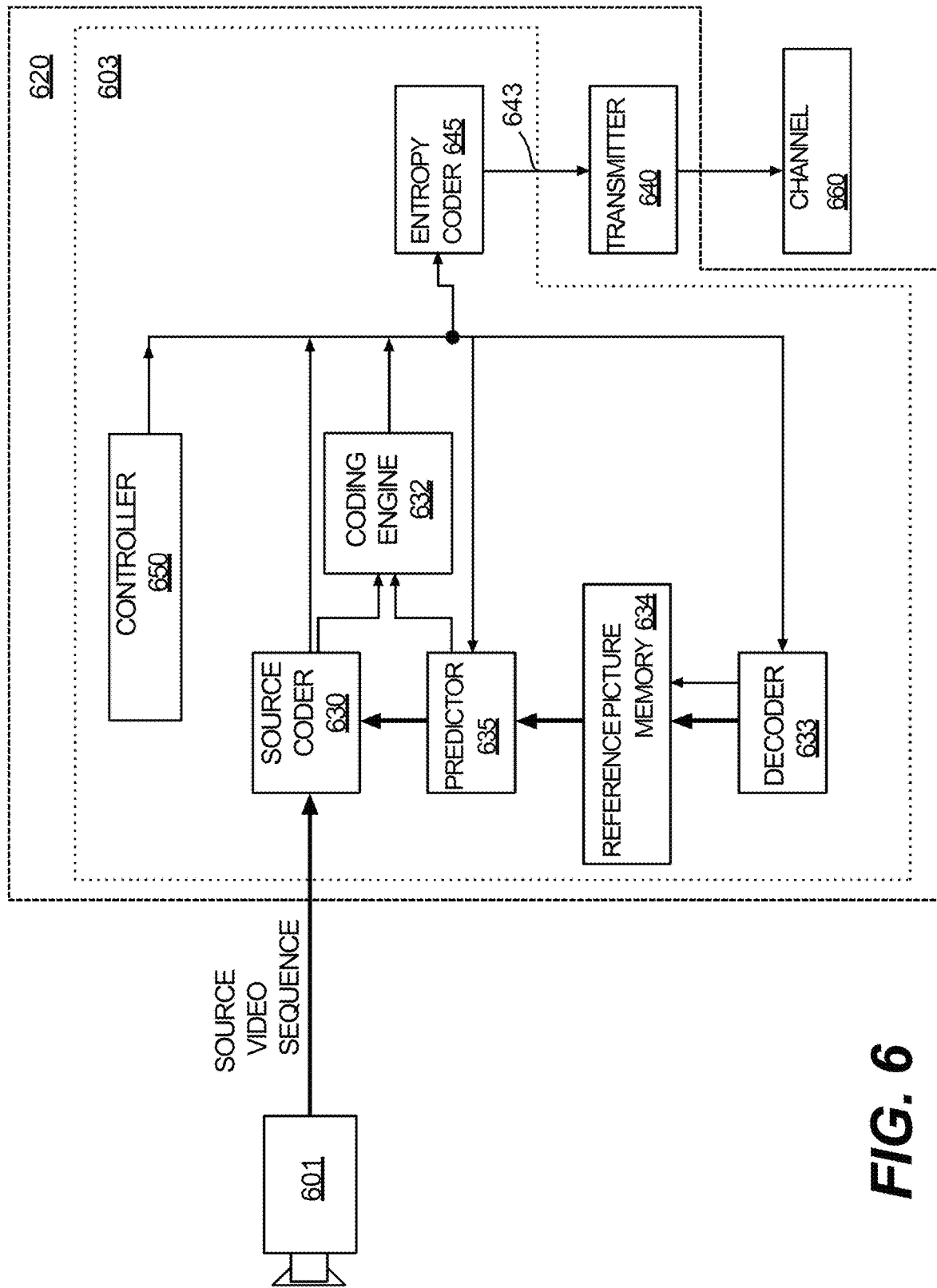
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
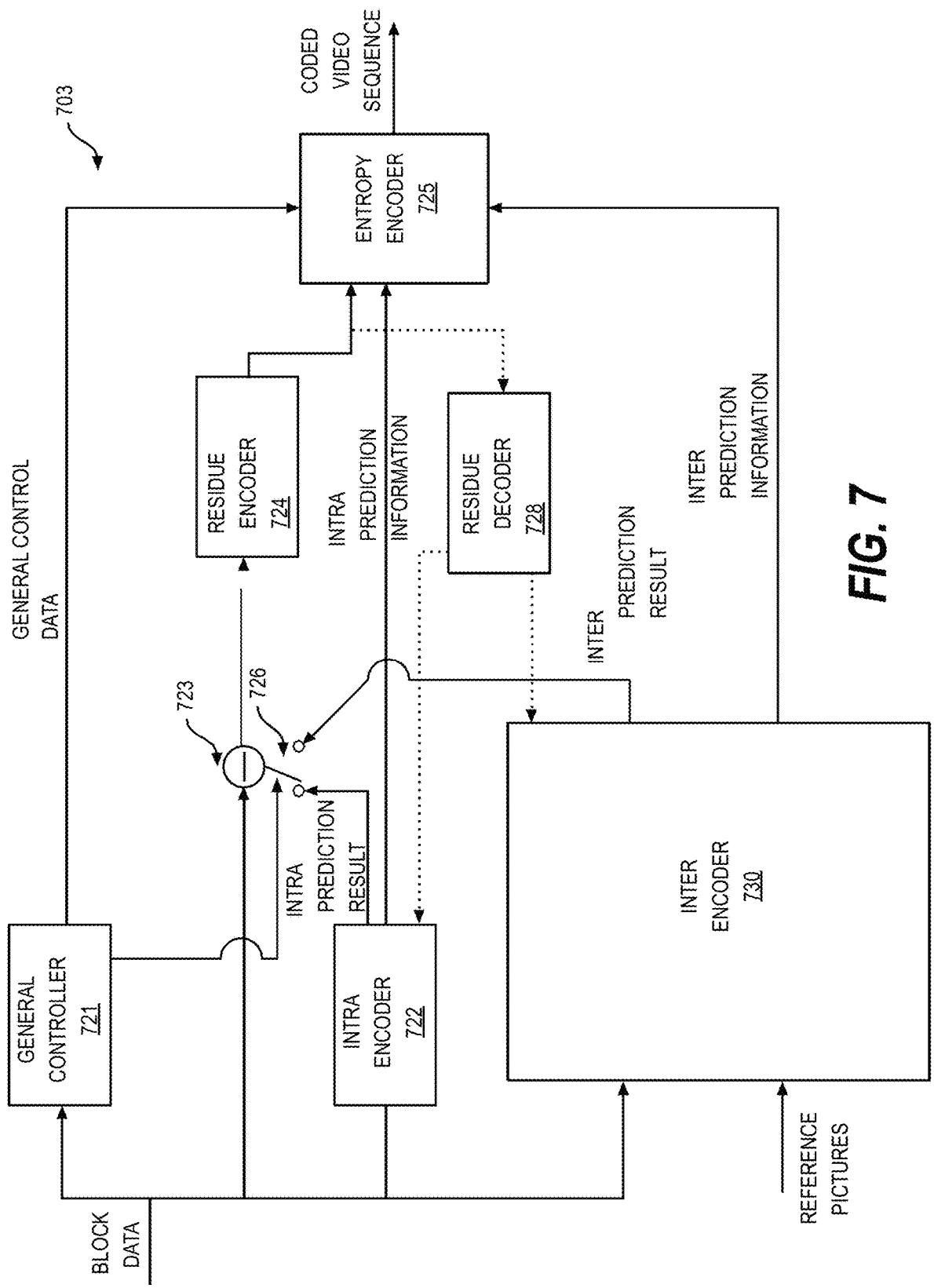
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
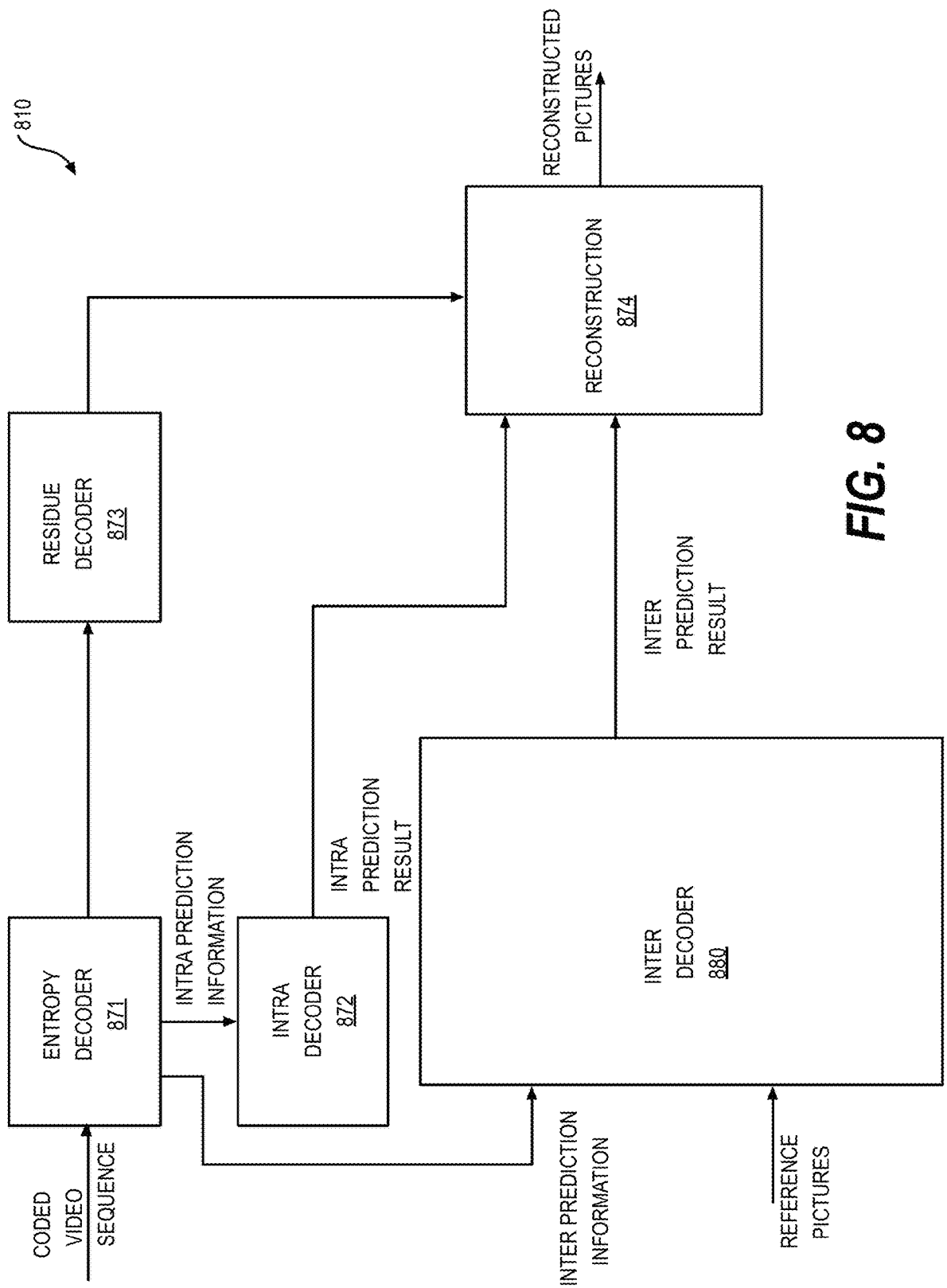
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residue decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residue decoder (873) may be configured to perform inverse quantization to extract de-quantized transform coefficients, and process the de-quantized transform coefficients to convert the residual from the frequency domain to the spatial domain. The residue decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residue decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Figure 9:
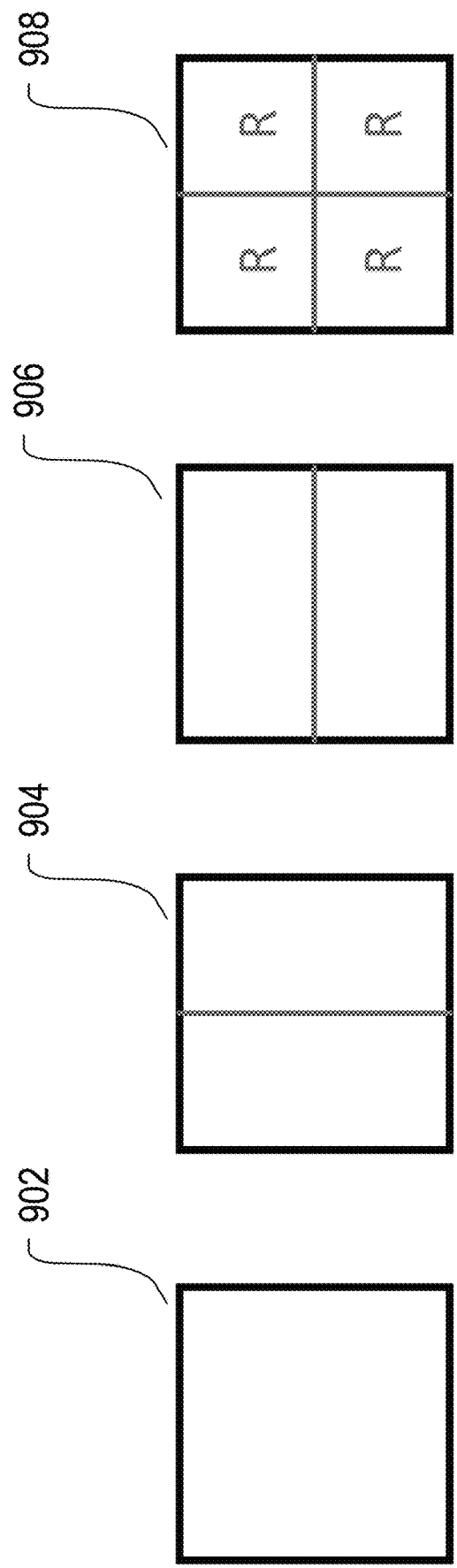
FIG. 9 shows a scheme of coding block partitioning according to example embodiments of the disclosure.

Turing to coding block partitioning, and in some example implementations, a predetermined pattern may be applied. As shown in FIG. 9, an example 4-way partition tree starting from a first predefined level (e.g., 64×64 block level) down to a second predefined level (e.g., 4×4 level) may be employed. For example, a base block may be subject to four partitioning options indicated by 902, 904, 906, and 908, with the partitions designated as R as being allowed for recursive partitions in that the same partition tree as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas a square partitioning is allowed to be recursive. The partitioning following FIG. 9 with recursion, if needed, generates a final set of coding blocks. Such scheme may apply to one or more of the color channels.

Figure 10:
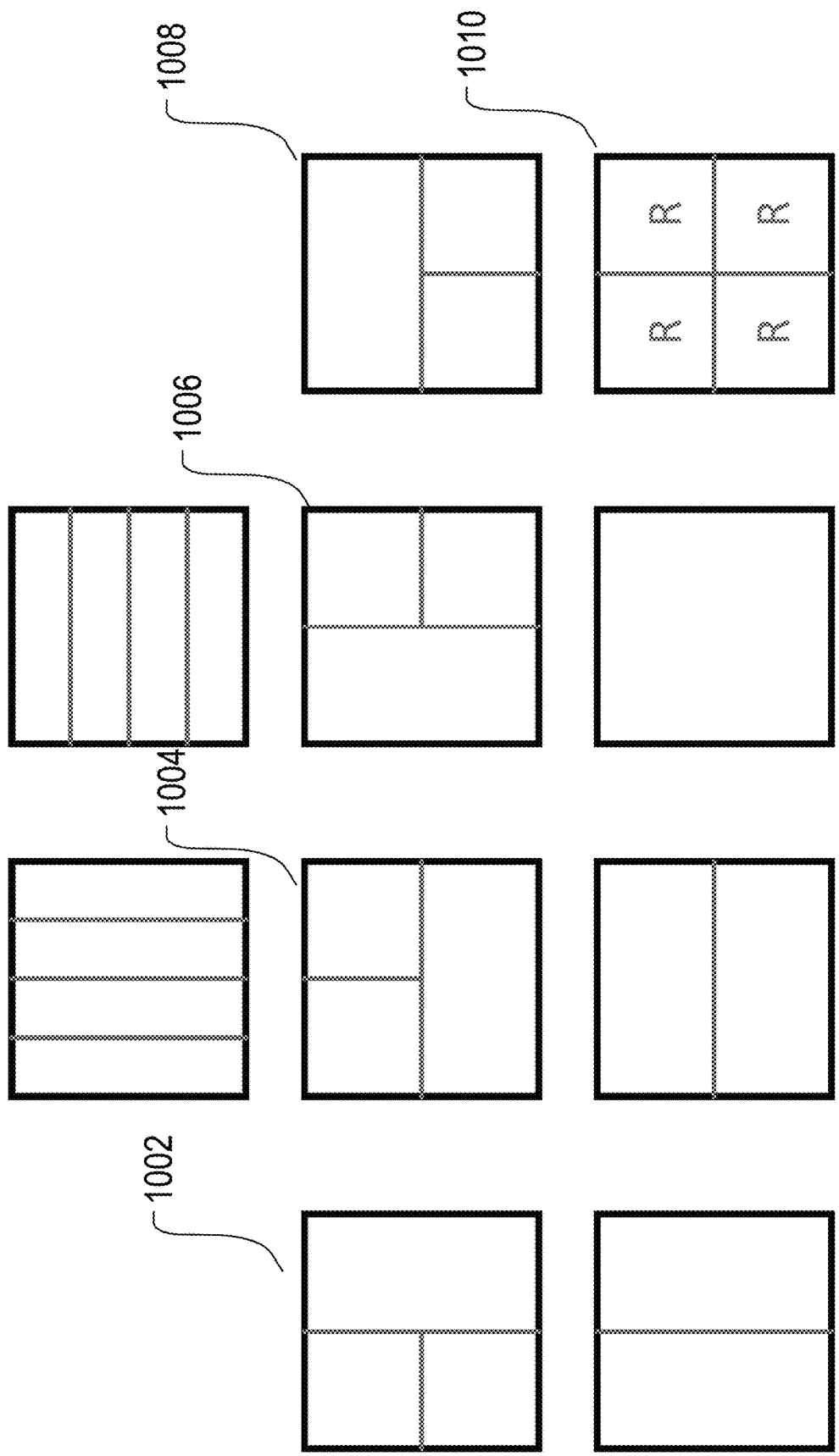
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from 128×128 level, or 64×64 level). The example partitioning structure of FIG. 10 includes various 2:1/1:2 and 4:1/1:4 rectangular partitions. The partition types with 3 sub-partitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some implementations, none of the rectangular partitions of FIG. 10 is allowed to be further subdivided. A coding tree depth may be further defined to indicate the splitting depth from the root node or root block. For example, the coding tree depth for the root node or root black, e.g. for a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions with patterns 1002, 1004, 1006, and 1006. The partitioning following FIG. 10 with recursion, if needed, generates a final set of coding blocks. Such scheme may apply to one or more of the color channels.

After dividing or partitioning a base block following any of the partitioning procedures or other procedures above, again, a final set of partitions or coding block may be obtained. Each of these partitions may be at one of various partitioning levels. Each of the partitions may be referred to as a coding block (CB). For the various example partitioning implementations above, each resulting CB may be of any of the allowed sizes and partitioning levels. They are referred to as coding block because they may form units for which some basic coding/decoding decisions may be made and coding/decoding parameters may be optimized, determined, and signaled in an encoded video bitstream. The highest level in the final partitions represents the depth of the coding block partitioning tree. Coding block may be a luma coding block or a chroma coding block.

In some other example implementations, a quadtree structure may be used for splitting base luma and chroma blocks recursively into coding units. Such splitting structure may be referred to as a coding tree unit (CTU), which is split into coding units (CUs) by using the quadtree structure to adapt the partitioning to various local characteristics of the base CTU. In such implementations, implicit quadtree split may be performed at picture boundary so that a block will keep quad-tree splitting until the size fits the picture boundary. The term CU is used to collectively refer to units of luma and chroma coding blocks (CBs).

In some implementations, a CB may be further partitioned. For example, A CB may be further partitioned into multiple prediction blocks (PBs) for purposes of intra or inter-frame prediction during coding and decoding processes. In other words, a CB may be further divided into different sub partitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. In some implementations, for example, TBs may be partitioned after PB partitions, and in particular, each PB, after being determined following partitioning of a coding block, may then be further partitioned into one or more TBs. For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios).

In some implementations, coding partition tree schemes or structures may be used. Coding partition tree schemes used for the luma and chroma channels may not need to be the same. In other words, luma and chroma channels may have separate coding tree structures. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, luma channel may be partitioned into CBs by one coding partition tree structure, and the chroma channel may be partitioned into chroma CBs by another coding partition tree structure.

A specific example implementation of coding block and transform block partitioning is described below. In such an example implementation, a base coding block may be split into coding blocks using recursive quadtree splitting described above. At each level, whether further quadtree splitting of a particular partition should continue may be determined by local video data characteristics. The resulting CBs may be at various quadtree splitting levels, of various sizes. The decision on whether to code a picture area using inter-picture (temporal) or intra-picture (spatial) prediction may be made at the CB level (or CU level, for all three-color channels). Each CB may be further split into one, two, four, or other number of PBs according to PB splitting type. Inside one PB, the same prediction process may be applied and the relevant information is transmitted to the decoder on a PB basis. After obtaining the residual block by applying the prediction process based on the PB splitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be further split into, e.g., four square-shaped TBs. Each TB may be further split recursively (using quadtree split) into smaller TBs, referred to as Residual Quad-Tree (RQT).

Figure 11:
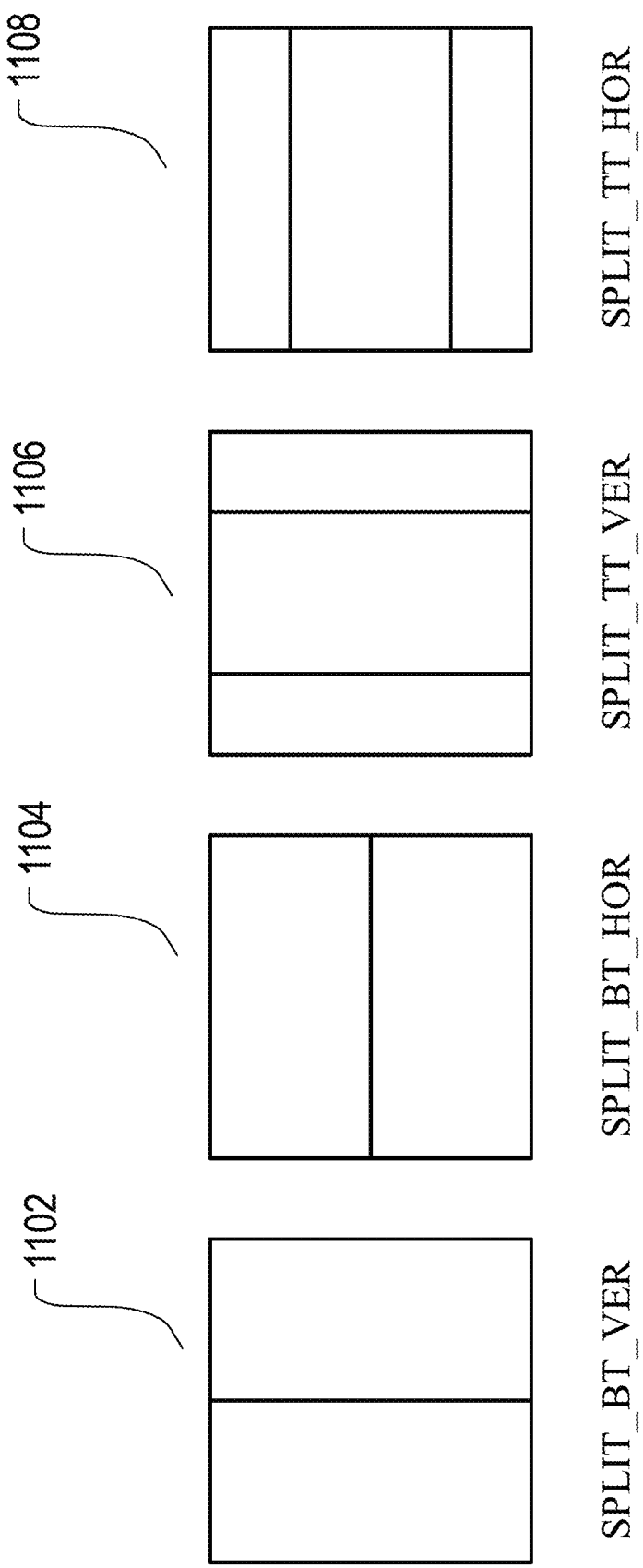
FIG. 11 shows another scheme of coding block partitioning according to example embodiments of the disclosure.

Another specific example for partitioning of a base coding block into CBs and other PBs and or TBs are described below. For example, rather than using a multiple partition unit types such as those shown in FIG. 10, a quadtree with nested multi-type tree using binary and ternary splits segmentation structure may be used. The separation of the CB, PB and TB concepts (i.e., the partitioning of CB into PBs and/or TBs, and the partitioning of PBs into TBs) may be abandoned except when needed for CBs that have a size too large for the maximum transform length, where such CBs may need further splitting. This example portioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a multi-type tree structure. An example of the multi-type tree structure is shown in FIG. 11. Specifically, the example multi-type tree structure of FIG. 11 includes four splitting types, referred to as vertical binary splitting (SPLIT_BT_VER) (1102), horizontal binary splitting (SPLIT_BT_HOR) (1104), vertical ternary splitting (SPLIT_TT_VER) (1106), and horizontal ternary splitting (SPLIT_TT_HOR) (1108). The CBs then corresponds to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB.

Figure 12:
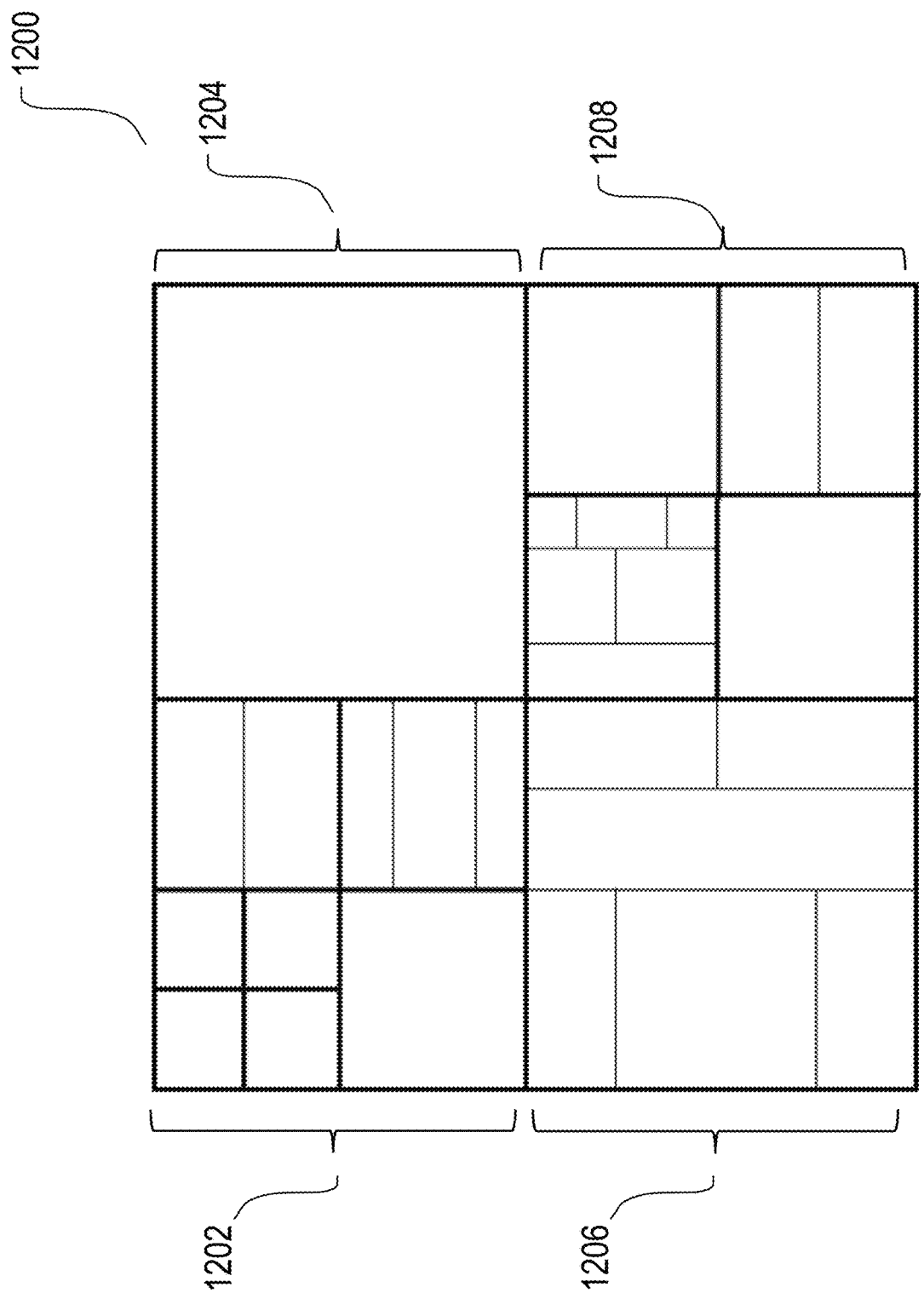
FIG. 12 shows another scheme of coding block partitioning according to example embodiments of the disclosure.

One example for the quadtree with nested multi-type tree coding block structure of block partition for one CTB is shown in FIG. 12. In more detail, FIG. 12 shows that the CTB 1200 is quadtree split into four square partitions 1202, 1204, 1206, and 1208. Decision to further use the multi-type tree structure of FIG. 11 for splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, 1104 of FIG. 11, non-splitting, and 1108 of FIG. 11, respective. Partition 1208 adopts another quadtree split, and the second level quadtree-split top-left, top-right, bottom-left, and bottom-right partitions adopts third level splitting of 1106 of FIG. 11, non-splitting, non-splitting, and 1104 of FIG. 11, respectively. Two of the subpartitions of the third-level top-left partition of 1208 are further split according to 1104 and 1108. Partition 1206 adopts a second level split pattern following 1102 of FIG. 11 into two partitions which are further split in a third-level according to 1108 and 1102 of the FIG. 11. A fourth level splitting is further applied to one of them according to 1104 of FIG. 11.

For the specific example above, the maximum luma transform size may be 64×64 and the maximum supported chroma transform size could be different from the luma at, e.g., 32×32. When the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base coding block into CBs above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree modes are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

Example implementations for partitioning a coding block or prediction block into transform blocks, and a coding order of the transform blocks are described in further detail below. In some example implementations, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations, for both intra and inter coded blocks, a coding block may be further partitioned into multiple transform blocks with a partitioning depth up to a predefined number of levels (e.g., 2 levels). The transform block partitioning depth and sizes may be related. An example mapping from the transform size of the current depth to the transform size of the next depth is shown in the following in Table 1.

TABLE 1

Transform partition size setting

| Transform size of current depth | Transform size of next depth |
|---|---|
| TX_4X4 | TX_4X4 |
| TX_8X8 | TX_4X4 |
| TX_16X16 | TX_8X8 |
| TX_32X32 | TX_16X16 |
| TX_64X64 | TX_32X32 |
| TX_4X8 | TX_4X4 |
| TX_8X4 | TX_4X4 |
| TX_8X16 | TX_8X8 |
| TX_16X8 | TX_8X8 |
| TX_16X32 | TX_16X16 |
| TX_32X16 | TX_16X16 |
| TX_32X64 | TX_32X32 |
| TX_64X32 | TX_32X32 |
| TX_4X16 | TX_4X8 |
| TX_16X4 | TX_8X4 |
| TX_8X32 | TX_8X16 |
| TX_32X8 | TX_16X8 |
| TX_16X64 | TX_16X32 |
| TX_64X16 | TX_32X16 |

Based on the example mapping of Table 1, for 1:1 square block, the next level transform split may create four 1:1 square sub-transform blocks. Transform partition may stop, for example, at 4×4. As such, a transform size for current depth of 4×4 corresponds to the same size of 4×4 for the next depth. In the example of Table 1, for 1:2/2:1 non-square block, the next level transform split will create two 1:1 square sub-transform blocks, whereas for 1:4/4:1 non-square block, the next level transform split will create two 1:2/2:1 sub transform blocks.

In some example implementations, for luma component of an intra coded block, additional restriction may be applied. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 13, together with coding order illustrated by the arrows. Specifically, 1302 shows the square coding block. A first-level split into 4 equal sized transform blocks according to Table 1 is shown in 1304 with coding order indicated by the arrows. A second-level split of all of the first-level equal sized blocks into 16 equal sized transform blocks according to Table 1 is shown in 1306 with coding order indicated by the arrows.

Figure 14:
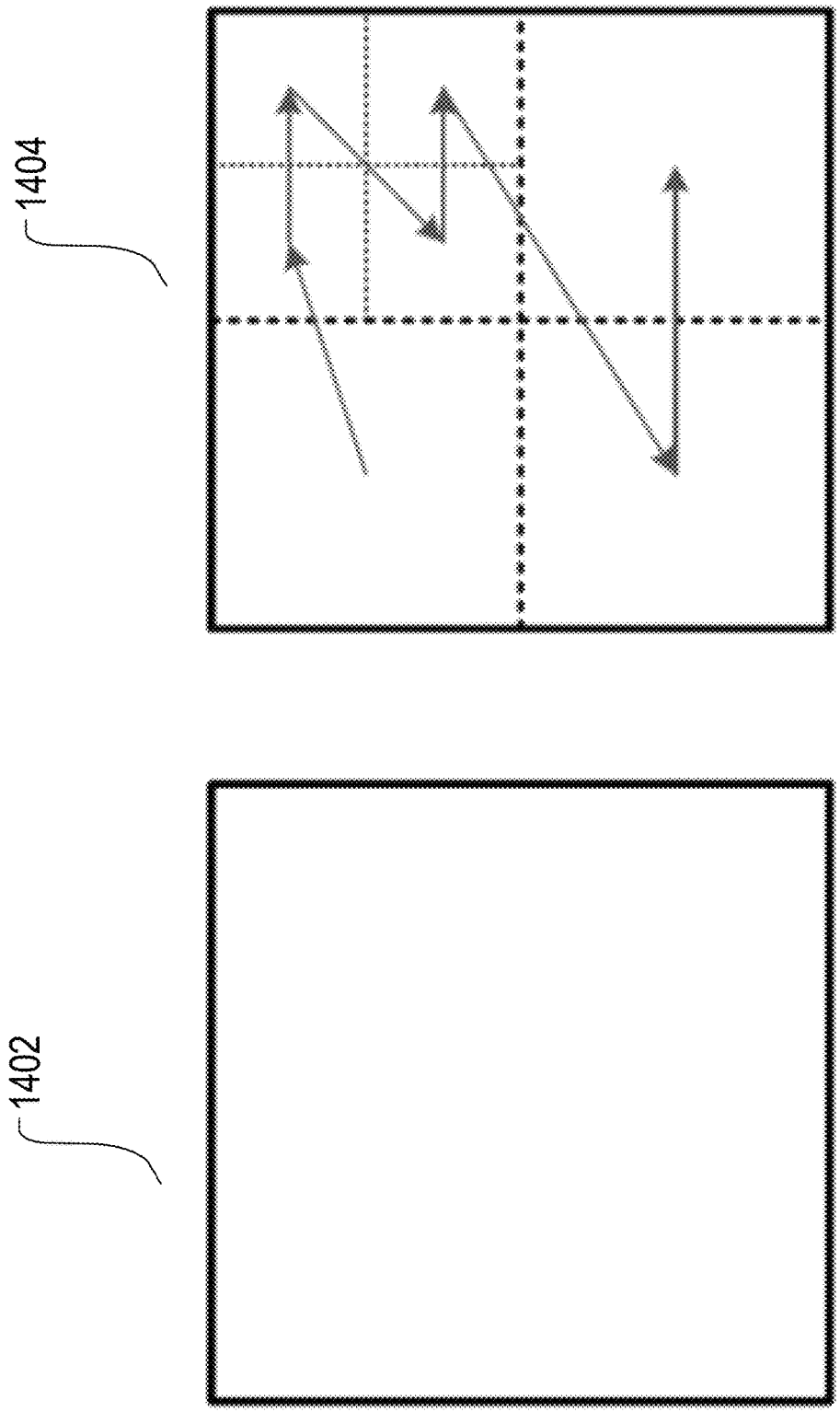
FIG. 14 shows another scheme for partitioning a coding block into multiple transform blocks and coding order of the transform block according to example embodiments of the disclosure.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 14. In the Example of FIG. 14, the inter coded block 1402 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1404. The example coding order of these 7 transform blocks is shown by the arrows in 1404 of FIG. 14.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)=min (H, 32) transform units, respectively.

Figure 15:
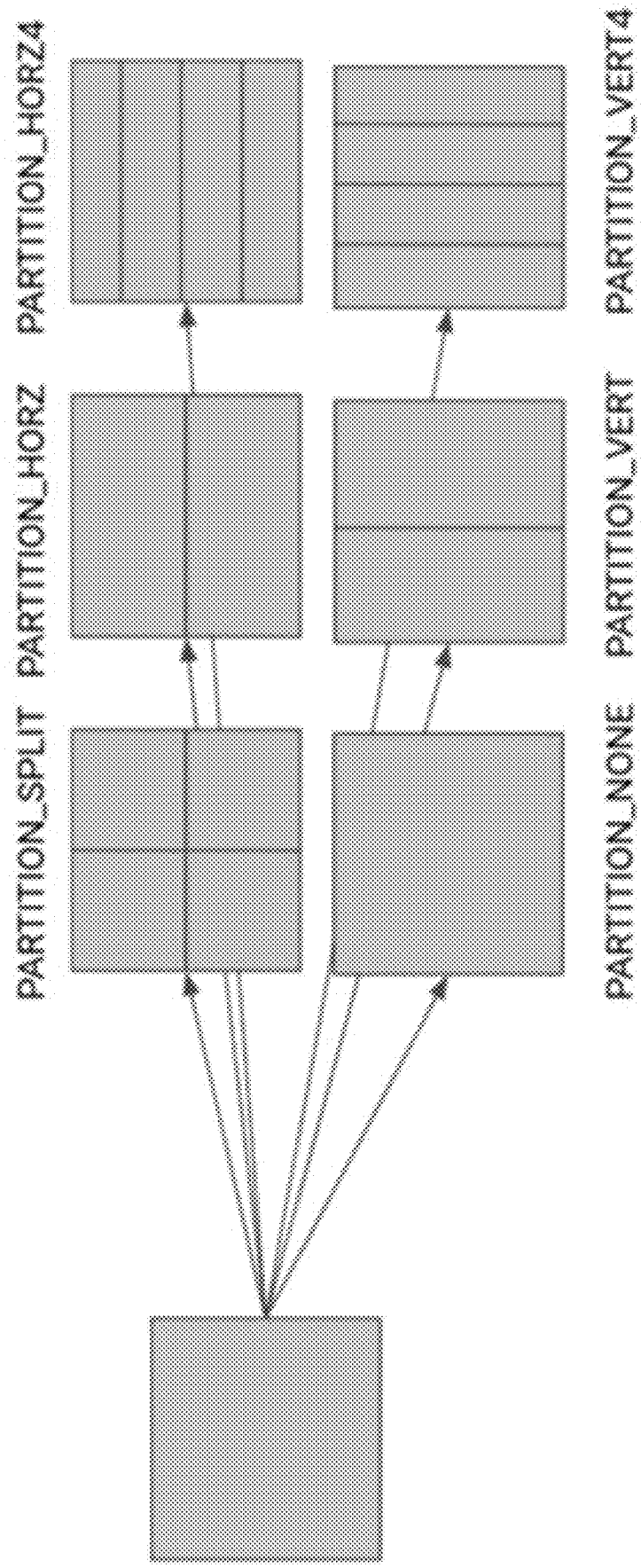
FIG. 15 shows another scheme for partitioning a coding block into multiple transform blocks according to example embodiments of the disclosure.

FIG. 15 further shows another alternative example scheme for partitioning a coding block or prediction block into transform blocks. As shown in FIG. 15, instead of using recursive transform partitioning, a predefined set of partitioning types may be applied to a coding block according a transform type of the coding block. In the particular example shown in FIG. 15, one of the 6 example partitioning types may be applied to split a coding block into various number of transform blocks. Such scheme may be applied to either a coding block or a prediction block.

In more detail, the partitioning scheme of FIG. 15 provides up to 6 partition types for any given transform type as shown in FIG. 15. In this scheme, every coding block or prediction block may be assigned a transform type based on, for example, a rate-distortion cost. In an example, the partition type assigned to the coding block or prediction block may be determined based on the transform partition type of the coding block or prediction block. A particular partition type may correspond to a transform block split size and pattern (or partition type), as shown by the 4 partition types illustrated in FIG. 15. A correspondence relationship between various transform types and the various partition types may be predefined. An example correspondence is shown below with the capitalized labels indicating the transform types that may be assigned to the coding block or prediction block based on rate distortion cost:

PARTITION_NONE: Assigns a transform size that is equal to the block size.
PARTITION_SPLIT: Assigns a transform size that is ½ the width of the block size and ½ the height of the block size.
PARTITION_HORZ: Assigns a transform size with the same width as the block size and ½ the height of the block size.
PARTITION_VERT: Assigns a transform size with ½ the width of the block size and the same height as the block size.
PARTITION_HORZ4: Assigns a transform size with the same width as the block size and ¼ the height of the block size.
PARTITION_VERT4: Assigns a transform size with ¼ the width of the block size and the same height as the block size.

In the example above, the partition types as shown in FIG. 15 all contain uniform transform sizes for the partitioned transform blocks. This is a mere example rather than a limitation. In some other implementations, mixed transform blocks sizes may be used for the partitioned transform blocks in a particular partition type (or pattern).

In various embodiments, a semi decoupled partitioning (SDP) scheme may be used, wherein luma and chroma blocks in one super block (SB) may have same or different block partitioning structures. The SDP scheme may also be called semi separate tree (SST) or flexible block partitioning for chroma component.

In some implementations, the SDP scheme may be dependent on a size of a luma coded block, or a depth of the luma block partitioning tree. For one example, when the size (e.g., in term of area) of the luma block is greater than a first threshold (T1) or a coding tree splitting depth of the luma block is smaller than or equal to a second threshold (T2), a chroma block may use the same coding tree structure as the luma block.

Otherwise, for another example, when the size of the luma block is smaller than or equal to T1, or when the luma splitting depth is larger than T2, the corresponding chroma block may have different coding block partitioning with luma component, which is called flexible block partitioning for chroma component. In some implementations, T1 is a positive integer, for example but not limited to, 128 or 256. T2 is a positive integer, for example but not limited to, 1 or 2.

Figure 16:
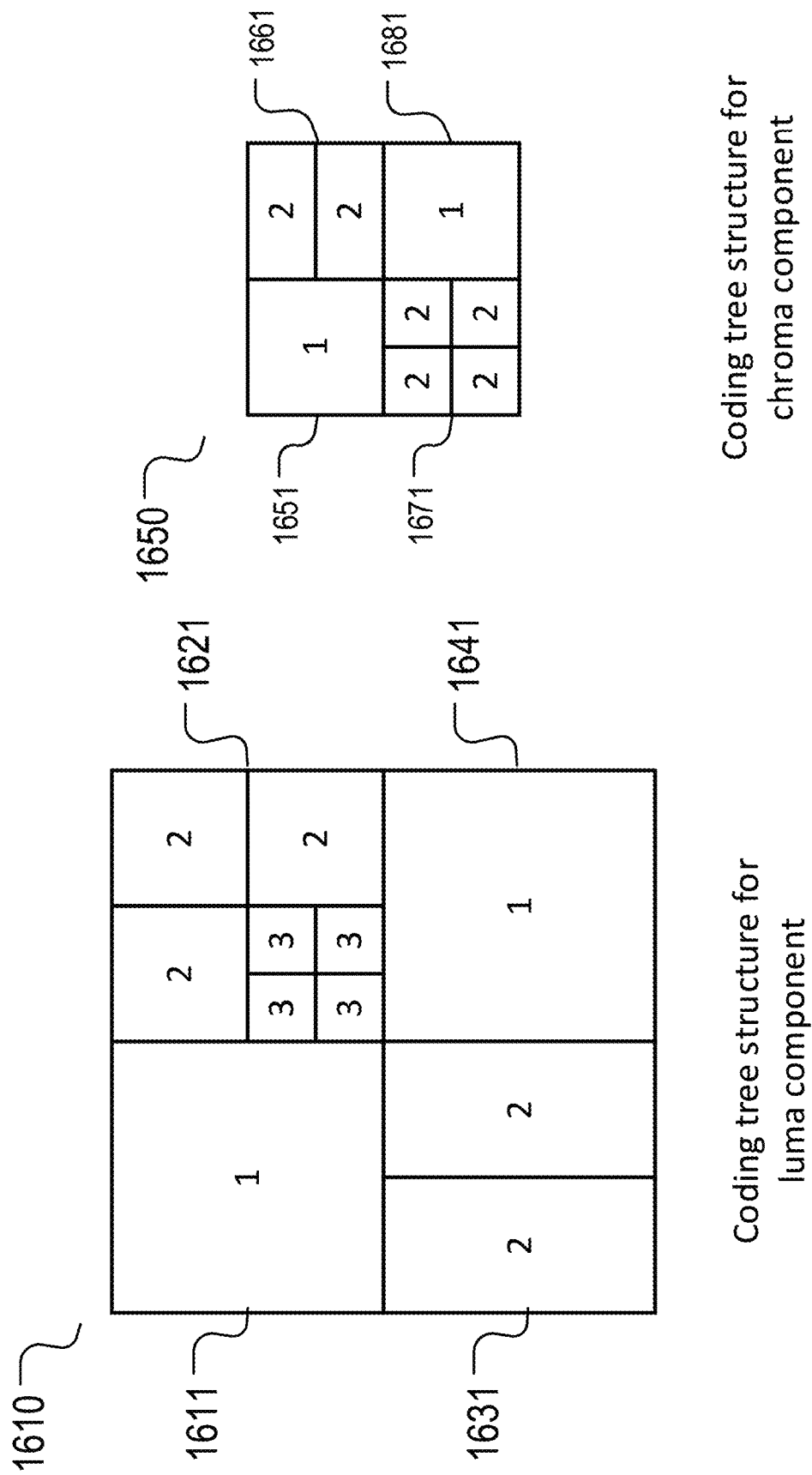
FIG. 16 shows one example of coding tree structures for luma and chroma components according to example embodiments of the disclosure.

FIG. 16 shows an example of different coding block partitioning structures for luma component (1610) and chroma component (1650), where T2 is set to 1. On a first level (level=1), the luma component and chroma component have same structure. On a second level (level=2), some level-1 blocks in the luma component and some level-1 blocks in the chroma component have same structure, for example, 1611 and 1651, 1641 and 1681, respectively; and some level-1 blocks in the luma component and some level-1 blocks in the chroma component have different structures, for example, 1621 and 1661, 1631 and 1671, respectively.

In various embodiment, an improved semi decoupled partitioning (SDP) scheme may be used, wherein luma and chroma component may share the partial tree structure from the root node of the super block, and the condition on when luma and chroma start separate tree partitioning depends on partitioning information of luma.

There may be some problems/issues associated with implementation of semi decoupled partitioning. For example, in some implementations, a chroma component may not allow transform partitioning, i.e., a transform unit size is same with a coding unit size. When the luma component and the chroma component use different coding block partitioning trees, the chroma component may typically prefer larger partitioning sizes, and/or a transform splitting for the chroma component may be beneficial if it is signaled separately.

The present disclosure describes various embodiment for transform block partitioning in video coding and/or decoding, addressing at least one of the issues/problems discussed above.

Figure 17:
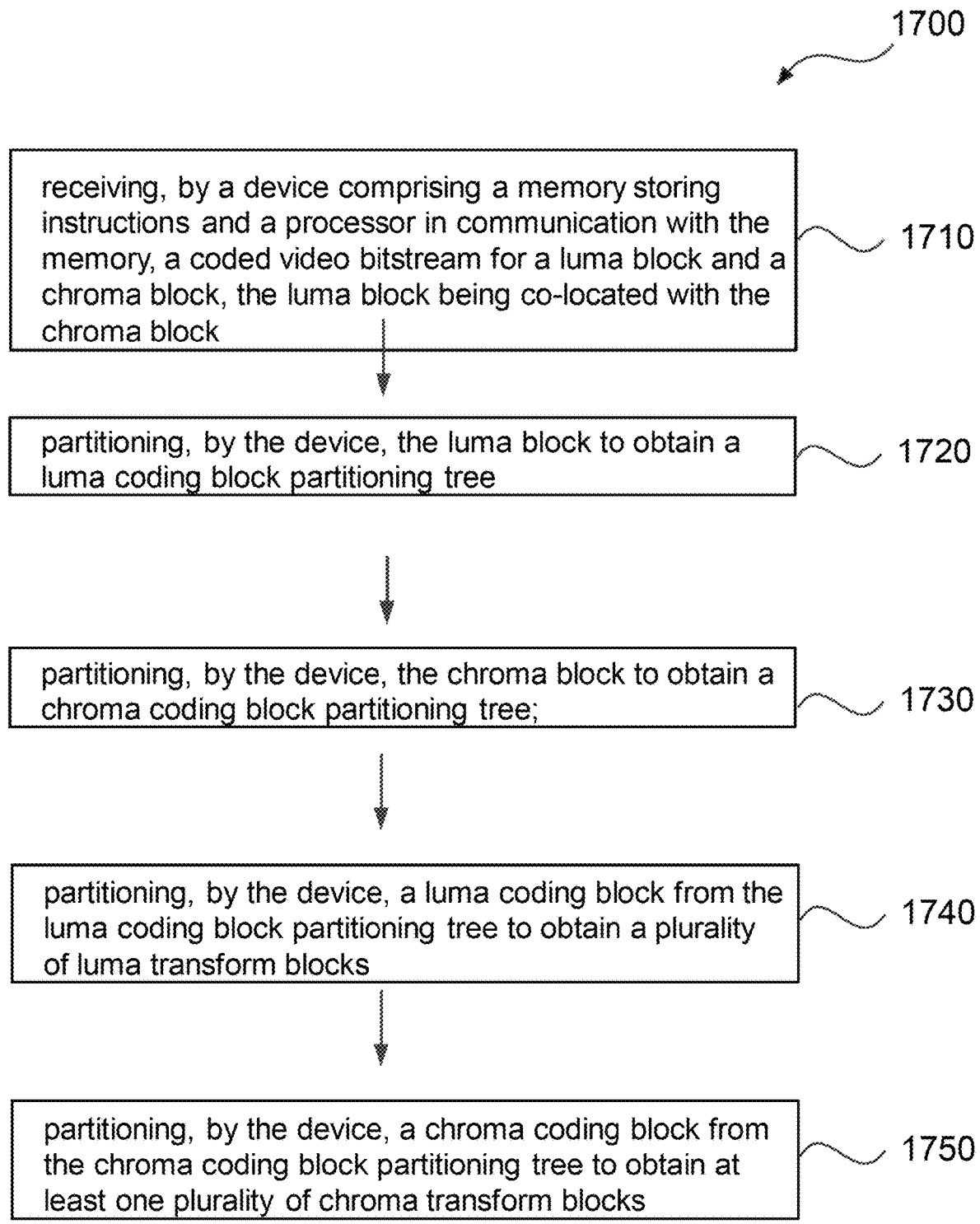
FIG. 17 shows a flow diagram of a method according to an example embodiment of the disclosure.

In various embodiment, referring to FIG. 17, a method 1700 for transform block partitioning in video decoding. The method 1700 may include a portion or all of the following steps: step 1710, receiving, by a device comprising a memory storing instructions and a processor in communication with the memory, a coded video bitstream for a luma block and a chroma block, the luma block being co-located with the chroma block; step 1720, partitioning, by the device, the luma block to obtain a luma coding block partitioning tree; step 1730, partitioning, by the device, the chroma block to obtain a chroma coding block partitioning tree; step 1740, partitioning, by the device, a luma coding block from the luma coding block partitioning tree to obtain a plurality of luma transform blocks; and/or step 1750, partitioning, by the device, a chroma coding block from the chroma coding block partitioning tree to obtain at least one plurality of chroma transform blocks.

In some implementations, the device may partition the luma coding block and the chroma coding block separately, and the obtained plurality of luma transform blocks is different from any one of the obtained at least one plurality of chroma transform blocks.

In some other implementations, the device may partition the luma coding block and the chroma coding block separately, and the obtained plurality of luma transform blocks is same as one of the obtained at least one plurality of chroma transform blocks.

In various embodiments in the present disclosure, a size of a block (for example but not limited to, a coding block, a prediction block, or a transform block) may refer to a width or a height of the block. The width or the height of the block may be an integer in a unit of pixels.

In various embodiments in the present disclosure, a size of a block (for example but not limited to, a coding block, a prediction block, or a transform block) may refer to an area size of the block. The area size of the block may be an integer calculated by the width of the block multiplied by the height of the bock in a unit of pixels.

In some various embodiments in the present disclosure, a size of a block (for example but not limited to, a coding block, a prediction block, or a transform block) may refer to a maximum value of a width or a height of the block, a minimum value of a width or a height of the block, or an aspect ratio of the block. The aspect ratio of the block may be calculated as the width divided by the height of the block, or may be calculated as the height divided by the width of the block.

In various embodiments in the present disclosure, a super block (SB) may refer to a largest coding unit (LCU), e.g., 128×128 block. A luma block may refer to a luma block being co-located with a chroma block. Semi decoupled partitioning (SDP) may be also referred as semi-decoupled tree (SDT). Block splitting may be also referred as block partitioning.

Referring to step 1710, the device may be the electronic device (530) in FIG. 5 or the video decoder (810) in FIG. 8. In some implementations, the device may be the decoder (633) in the encoder (620) in FIG. 6. In other implementations, the device may be a portion of the electronic device (530) in FIG. 5, a portion of the video decoder (810) in FIG. 8, or a portion of the decoder (633) in the encoder (620) in FIG. 6. The coded video bitstream may be the coded video sequence in FIG. 8, or an intermediate coded data in FIG. 6 or 7. The coded video bitstream may be for a luma block (e.g., 1810 in FIG. 18) and a chroma block (e.g., 1850 in FIG. 18), and the luma block and chroma block are co-located with each other.

In some implementations, separate transform unit splitting and signalling may be applied for different color components, for example, luma component and chroma component. The chroma component may include more than one color components, for example, a first color component (blue) and a second color component (red).

Figure 18:
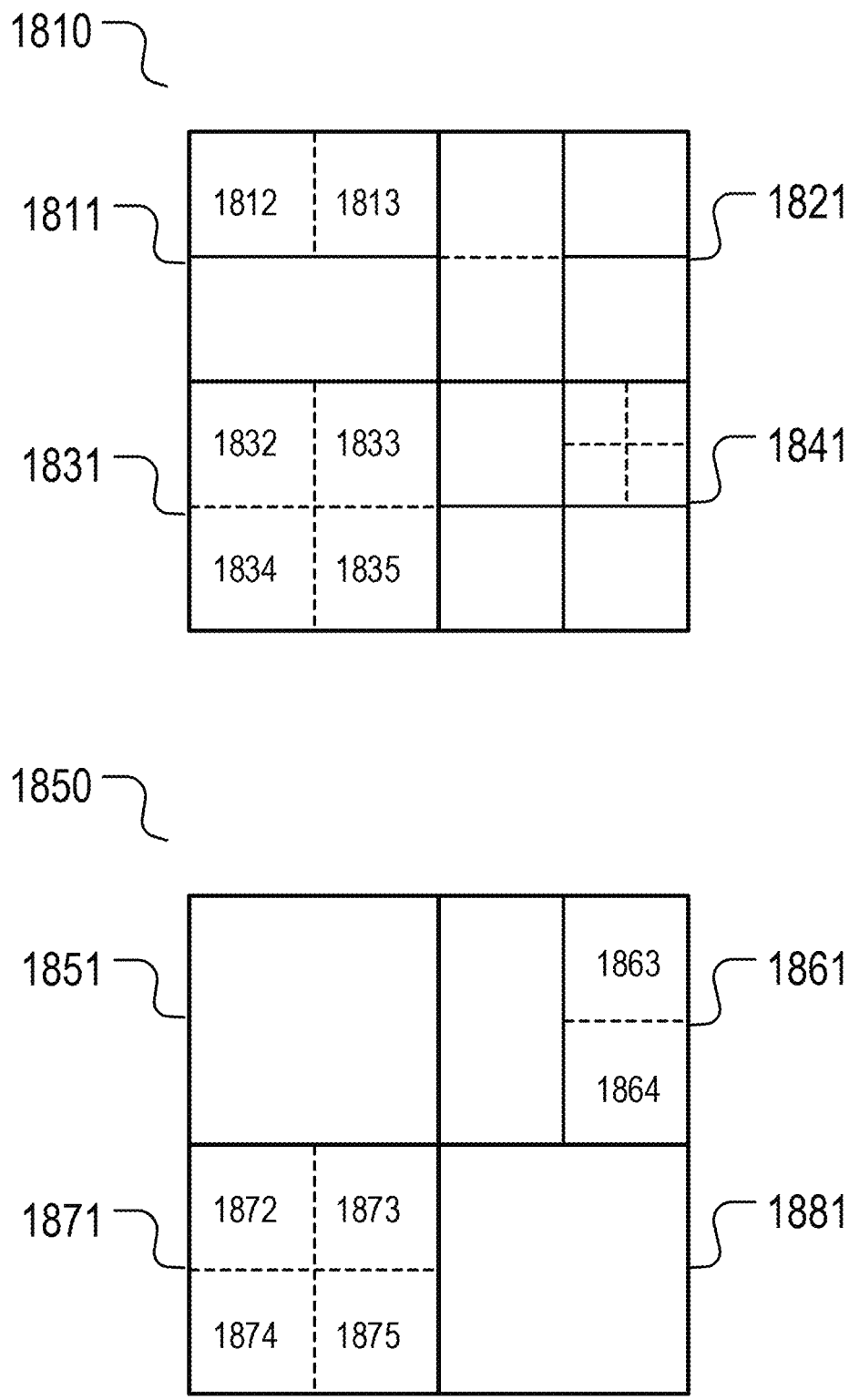
FIG. 18 shows one example of decoupled transform partitioning for luma and chroma components according to example embodiments of the disclosure.

FIG. 18 shows an example of applying separate transform unit splitting when coding block partitioning is different, where solid lines indicate the coding block partitioning boundaries and dashed lines indicate the transform unit partitioning boundaries. The luma block (1810) includes, on the level-1, 1811, 1821, 1831, and 1841. The chroma block (1850) includes, at the level-1, 1851, 1861, 1871, and 1881. FIG. 18 shows coding block partitioning (solid lines) patterns are different between luma and chroma components, for example in 1811 and 1851, and 1821 and 1861, and 1841 and 1881, while transform block partitioning (dashed lines) are enabled for both luma and chroma but with different splitting patterns, for example 1821 and 1861.

Referring to step 1720, the device may partition the luma block to obtain a luma coding block partitioning tree. Referring to FIG. 18, the luma block (1810) is partitioned to obtain the luma coding block partitioning tree, illustrated by the solid lines in 1810.

Referring to step 1730, the device may partition the chroma block to obtain a chroma coding block partitioning tree. Referring to FIG. 18, the chroma block (1850) is partitioned to obtain the chroma coding block partitioning tree, illustrated by the solid lines in 1850.

Referring to step 1740, the device may partition a luma coding block from the luma coding block partitioning tree to obtain a plurality of luma transform blocks. Some luma coding block in 1810 are partitioned to further split into a plurality of luma transform blocks, illustrated by the dashed lines in 1810. For one example, a luma coding block (upper half in 1811) is partitioned to split into two luma transform blocks (1812, and 1813). For another example, a luma coding block (1831) is partitioned to split into four luma transform blocks (1832, 1833, 1834, and 1835).

Referring to step 1750, the device may partition a chroma coding block from the chroma coding block partitioning tree to obtain at least one plurality of chroma transform blocks. Some luma coding block in 1850 are partitioned to further split into a plurality of luma transform blocks, illustrated by the dashed lines in 1850. For one example, a chroma coding block (right half in 1861) is partitioned to split into two chroma transform blocks (1863 and 1864). For another example, a chroma coding block (1871) is partitioned to split into four chroma transform blocks (1872, 1873, 1874, and 1875).

In various embodiments, the luma coding block partitioning tree is different from the chroma coding block partitioning tree; and/or the coded video bitstream comprises a luma parameter and a chroma parameter. The luma parameter may be extracted from the coded video bitstream and indicate a transform partitioning structure from the luma coding block and/or a plurality of luma transform blocks. The chroma parameter may be extracted from the coded video bitstream and indicate a transform partitioning structure from the chroma coding block and/or a plurality of chroma transform blocks.

Step 1740 may include partitioning the luma coding block, according to the luma parameter, to obtain the plurality of luma transform blocks; and/or step 1750 may include partitioning the chroma coding block, according to the chroma parameter, to obtain a plurality of chroma transform blocks.

In some implementations, when luma and chroma color channels apply different coding block partitioning trees, transform unit splitting may allowed for chroma channel and the transform unit splitting may be signaled separately for chroma channel in comparison with the luma channel.

In various embodiments, the luma coding block partitioning tree is different from the chroma coding block partitioning tree; and/or the coded video bitstream comprises a luma parameter, a first chroma parameter, and a second chroma parameter. The luma parameter may be extracted from the coded video bitstream and indicate a transform partitioning structure from the luma coding block and/or a plurality of luma transform blocks. The first chroma parameter corresponds a first color (e.g., blue) in the chroma component; and the second chroma parameter corresponds a second color (e.g., red) in the chroma component. The first chroma parameter may be extracted from the coded video bitstream and indicate a transform partitioning structure from the chroma coding block and/or a plurality of chroma transform blocks for the first color in the chroma component. The second chroma parameter may be extracted from the coded video bitstream and indicate a transform partitioning structure from the chroma coding block and/or a plurality of chroma transform blocks for the second color in the chroma component. The transform partitioning structure for the first and second color may be different.

Step 1740 may include partitioning the luma coding block, according to the luma parameter, to obtain the plurality of luma transform blocks. Step 1750 may include partitioning a first component the chroma coding block, according to the first chroma parameter, to obtain a first plurality of chroma transform blocks, and/or partitioning a second component the chroma coding block, according to the second chroma parameter, to obtain a second plurality of chroma transform blocks. The first component of the chroma coding block may refer to a first color channel (e.g., blue) of the coding block, and/or the second component of the chroma coding block may refer to a second color channel (e.g., red) of the coding block.

In some implementations, when luma and chroma color channels apply different coding block partitioning trees, transform unit splitting is allowed for chroma and the transform unit splitting may be signaled separately for different color components of chroma, e.g., Cb and Cr.

In some other implementations, when color components apply different coding block partitioning trees, transform unit splitting is allowed for each color components and transform unit splitting may be signaled separately for each color components.

In various embodiments, a transform depth of the chroma coding block comprises 0 or 1; and/or the chroma coding block comprises a quadtree transform splitting; and/or the chroma coding block being non-square rectangular block indicates a binary transform splitting.

In some implementations, for different color components, different transform unit partitioning patterns and/or depth may be applied. In one example, for chroma channel or components, transform depth may be limited to be 0 or 1. In another example, for chroma channel or components, only quadtree transform splitting is allowed. In another example, for chroma channel or components, for non-square rectangular blocks, only binary transform splitting is allowed. In another example, whether horizontal binary transform splitting or vertical binary transform splitting is applied depends on an aspect ratio of the coding block: when the aspect ratio of the coding block is larger than 1 (e.g., the horizontal dimension is longer than the vertical dimension of the coding block), a vertical binary transform splitting may be used; when the aspect ratio of the coding block is smaller than 1 (e.g., the horizontal dimension is shorter than the vertical dimension of the coding block), a horizontal binary transform splitting may be used to the coding block.

In various embodiments, step 1750 may include partitioning the chroma coding block to obtain at least one plurality of chroma transform blocks in response to satisfying at least one of the following conditions: the chroma coding block being larger than a minimum coding block size, the chroma coding block being smaller than a maximum coding block size, the chroma coding block using at least one intra prediction mode, or the chroma coding block using at least one transform type. In some implementations, the minimum coding block size corresponds to a minimum coding width comprising at least one of the following: 4, 8, 16, 32, or 64; the maximum coding block size corresponds to a maximum coding length comprising at least one of the following: 32, 64, 128, or 256; and/or the at least one intra prediction mode comprises at least one directional intra prediction mode.

In some other implementations, for different color components, a minimum coding block size that allows transform splitting may be different. In one example, for chroma coding block smaller than M×N, transform unit splitting is disallowed. Example values of M and N includes, but not limited to 4, 8, 16, 32, 64.

In some other implementations, for different color components, the maximum coding block size that allows transform splitting may be different.

In some other implementations, for chroma coding block with size being larger than M×N, transform unit splitting may be disallowed. Example values of M and N includes, but not limited to 32, 64, 128, 256.

In some other implementations, for intra coded blocks, when luma and chroma color channels apply different coding block partitioning trees, transform unit splitting in the chroma color channel may be allowed for only certain intra prediction modes. In one example, the transform unit splitting in chroma coded blocks in the chroma color channel may be only allowed for directional intra prediction modes.

In some other implementations, when transform unit splitting in chroma is allowed, only certain transform types are allowed.

In various embodiments, the coded video bitstream comprises a luma coding parameter, a luma transform parameter, a chroma coding parameter, and a chroma transform parameter; and/or during entropy decoding of the coded video bitstream, the chroma transform parameter uses as context at least one of the following: the luma coding parameter, the luma transform parameter, or the chroma coding parameter.

The luma coding parameter may be extracted from the coded video bitstream and indicate a coding block partitioning structure of a luma component. The luma transform parameter may be extracted from the coded video bitstream and indicate a transform partitioning structure from the luma coding block and/or a plurality of luma transform blocks. The chroma coding parameter may be extracted from the coded video bitstream and indicate a coding block partitioning structure of a chroma component. The chroma transform parameter may be extracted from the coded video bitstream and indicate a transform partitioning structure from the chroma coding block and/or a plurality of chroma transform blocks.

In some other implementations, for signalling the chroma transform block partitioning pattern, the luma coding block partitioning flag and/or transform block splitting flag may be used as the context for entropy coding the chroma transform block partitioning flag.

In various embodiments, when transform unit splitting from a coded block in chroma component is allowed, a size of all the chroma transform units may be the same within the coded block. In one example, a flag may be signaled in the coded block level to indicate the transform depth of chroma component (or each chroma channel). In another example, the transform size of luma transform units in the coded block may not be the same whereas the size of all the chroma transform unit is the same within the coded block.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block; and in the chroma block, the embodiments may be applied to more than one color components separately or may be applied to more than one color components together.

The techniques described above, can be implemented as computer software using computer-readable instructions and physically stored in one or more computer-readable media. For example, FIG. 19 shows a computer system (2600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
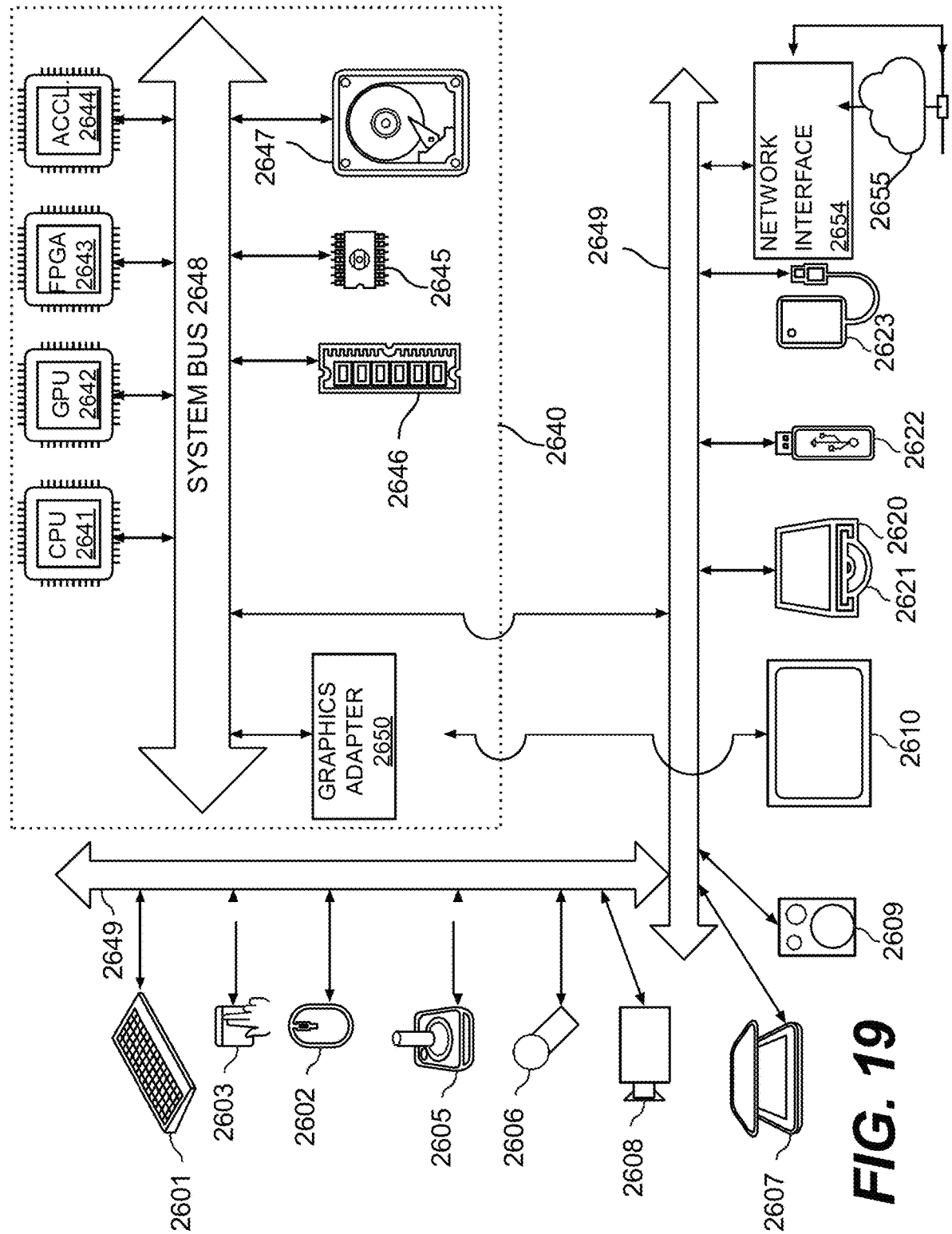
FIG. 19 shows a schematic illustration of a computer system in accordance with example embodiments of the disclosure.

The components shown in FIG. 19 for computer system (2600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2600).

Computer system (2600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2601), mouse (2602), trackpad (2603), touch screen (2610), data-glove (not shown), joystick (2605), microphone (2606), scanner (2607), camera (2608).

Computer system (2600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2610), data-glove (not shown), or joystick (2605), but there can also be tactile feedback devices that do not serve as input devices), audio output devices (such as: speakers (2609), headphones (not depicted)), visual output devices (such as screens (2610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2600) can also include human accessible storage devices and their associated media such as optical media including CD/DVD ROM/RW (2620) with CD/DVD or the like media (2621), thumb-drive (2622), removable hard drive or solid state drive (2623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2600) can also include an interface (2654) to one or more communication networks (2655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (2649) (such as, for example USB ports of the computer system (2600)); others are commonly integrated into the core of the computer system (2600) by attachment to a system bus as described below (for example Ethernet interface into a PC computer system or cellular network interface into a smartphone computer system). Using any of these networks, computer system (2600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2640) of the computer system (2600).

The core (2640) can include one or more Central Processing Units (CPU) (2641), Graphics Processing Units (GPU) (2642), specialized programmable processing units in the form of Field Programmable Gate Areas (FPGA) (2643), hardware accelerators for certain tasks (2644), graphics adapters (2650), and so forth. These devices, along with Read-only memory (ROM) (2645), Random-access memory (2646), internal mass storage such as internal non-user accessible hard drives, SSDs, and the like (2647), may be connected through a system bus (2648). In some computer systems, the system bus (2648) can be accessible in the form of one or more physical plugs to enable extensions by additional CPUs, GPU, and the like. The peripheral devices can be attached either directly to the core's system bus (2648), or through a peripheral bus (2649). In an example, the screen (2610) can be connected to the graphics adapter (2650). Architectures for a peripheral bus include PCI, USB, and the like.

CPUs (2641), GPUs (2642), FPGAs (2643), and accelerators (2644) can execute certain instructions that, in combination, can make up the aforementioned computer code. That computer code can be stored in ROM (2645) or RAM (2646). Transitional data can also be stored in RAM (2646), whereas permanent data can be stored for example, in the internal mass storage (2647). Fast storage and retrieve to any of the memory devices can be enabled through the use of cache memory, that can be closely associated with one or more CPU (2641), GPU (2642), mass storage (2647), ROM (2645), RAM (2646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (2600), and specifically the core (2640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2640) that are of non-transitory nature, such as core-internal mass storage (2647) or ROM (2645). The software implementing various embodiments of the present disclosure can be stored in such devices and executed by core (2640). A computer-readable medium can include one or more memory devices or chips, according to particular needs. The software can cause the core (2640) and specifically the processors therein (including CPU, GPU, FPGA, and the like) to execute particular processes or particular parts of particular processes described herein, including defining data structures stored in RAM (2646) and modifying such data structures according to the processes defined by the software. In addition or as an alternative, the computer system can provide functionality as a result of logic hardwired or otherwise embodied in a circuit (for example: accelerator (2644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:
1. A method for video decoding, the method comprising:
receiving, by a device comprising a memory storing instructions and a processor in communication with the memory, a coded video bitstream that includes a luma block and a chroma block, the luma block being co-located with the chroma block;

generating a plurality of luma sub-blocks by partitioning, by the device, the luma block in accordance with a luma partitioning tree;

generating a plurality of chroma sub-blocks by partitioning, by the device, the chroma block in accordance with a chroma partitioning tree;

when the luma partitioning tree is different than the chroma partitioning tree and the chroma block has a corresponding directional intra prediction mode:
   parsing the coded video bitstream to identify a value of a luma transform parameter;
   generating a plurality of luma transform blocks by splitting, by the device, the plurality of luma sub-blocks in accordance with a luma transform unit splitting that is based on the value of the luma transform parameter;
   parsing the coded video bitstream to identify a value of a chroma transform parameter; and
   generating a plurality of chroma transform blocks by splitting, by the device, the plurality of chroma sub-blocks in accordance with a chroma transform unit splitting that is based on the value of the chroma transform parameter, wherein the luma transform unit splitting is different than the chroma transform unit splitting; and when the luma partitioning tree is different than the chroma partitioning tree and the chroma block has a corresponding non-directional intra prediction mode, prohibiting transform partitioning of the plurality of chroma sub-blocks.

2. The method according to claim 1, wherein:
the coded video bitstream comprises a luma parameter and a chroma parameter;
the luma partitioning tree is identified based on the luma parameter; and
the chroma partitioning tree is identified based on the chroma parameter.

3. The method according to claim 1, wherein:
the coded video bitstream comprises a luma parameter indicating how to partition a luma component of a current block, a first chroma parameter indicating how to partition a first chroma component of the current block, and a second chroma parameter indicating how to partition a second chroma component of the current block.

4. The method according to claim 1, wherein:
a transform depth for the chroma transform unit splitting is one of 0 and 1; or
the chroma transform unit splitting comprises a quadtree transform splitting, or a binary transform splitting.

5. The method according to claim 1, wherein the chroma transform unit splitting is selected in accordance with satisfying at least one of the following conditions:
a chroma sub-block being larger than a minimum coding block size,
the chroma sub-block being smaller than a maximum coding block size,
the chroma sub-block using at least one intra prediction mode, or
the chroma sub-block using at least one transform type.

6. The method according to claim 5, wherein:
the minimum coding block size corresponds to a minimum coding width comprising at least one of the following: 4, 8, 16, 32, or 64;
the maximum coding block size corresponds to a maximum coding length comprising at least one of the following: 32, 64, 128, or 256; or the at least one intra prediction mode comprises at least one directional intra prediction mode.

7. The method according to claim 1, wherein:
the coded video bitstream comprises a luma coding parameter, the luma transform parameter, a chroma coding parameter, and the chroma transform parameter; and
during entropy decoding of the coded video bitstream, the chroma transform parameter uses as context at least one of the following: the luma coding parameter, the luma transform parameter, or the chroma coding parameter.

8. A method of video encoding, the method comprising:
receiving video data comprising a luma block and a chroma block, wherein the luma block is co-located with the chroma block;

generating a plurality of luma sub-blocks by partitioning the luma block in accordance with a luma partitioning tree;

generating a plurality of chroma sub-blocks by partitioning the chroma block in accordance with a chroma partitioning tree;

when the luma partitioning tree is different than the chroma partitioning tree and the chroma block has a corresponding directional intra prediction mode:
   generating a plurality of luma transform blocks by splitting the plurality of luma sub-blocks in accordance with a luma transform unit splitting that is based on a value of a luma transform parameter; and
   generating a plurality of chroma transform blocks by splitting the plurality of chroma sub-blocks in accordance with a chroma transform unit splitting that is based on a value of a chroma transform parameter, wherein the luma transform unit splitting is different than the chroma transform unit splitting; and when the luma partitioning tree is different than the chroma partitioning tree and the chroma block has a corresponding non-directional intra prediction mode, prohibiting transform partitioning of the plurality of chroma sub-blocks.

9. The method of claim 8, further comprising signaling, via a video bitstream, a luma parameter indicating the luma partitioning tree and a chroma parameter indicating a chroma partitioning tree.

10. The method of claim 8, further comprising signaling, via a video bitstream, a luma parameter indicating how to partition a luma component of a current block, a first chroma parameter indicating how to partition a first chroma component of the current block, and a second chroma parameter indicating how to partition a second chroma component of the current block.

11. The method of claim 8, wherein:
a transform depth for the chroma transform unit splitting is one of 0 and 1; or
the chroma transform unit splitting comprises a quadtree transform splitting, or a binary transform splitting.

12. The method of claim 8, wherein the chroma transform unit splitting is selected in accordance with satisfying at least one of the following conditions:
a chroma sub-block being larger than a minimum coding block size,
the chroma sub-block being smaller than a maximum coding block size,
the chroma sub-block using at least one intra prediction mode, or
the chroma sub-block using at least one transform type.

13. The method of claim 8, further comprising:
signaling, via a video bitstream, a luma coding parameter, the luma transform parameter, a chroma coding parameter, and the chroma transform parameter; and
during entropy encoding, the chroma transform parameter uses as context at least one of the following: the luma coding parameter, the luma transform parameter, or the chroma coding parameter.

14. A method of processing visual media data, the method comprising:
obtaining a source video sequence;
performing a conversion between the source video sequence and a bitstream of visual media data according to a format rule, wherein the bitstream comprises:
a luma transform parameter;
a chroma transform parameter;
a plurality of encoded blocks, including a current block comprising a plurality of encoded luma sub-blocks and a plurality of encoded chroma sub-blocks; and
a plurality of transform coefficients for the current block, the plurality of transform coefficients corresponding to a plurality of luma transform blocks and a plurality of chroma transform blocks; and
wherein the format rule specifies that:
when the luma partitioning tree is different than the chroma partitioning tree and the encoded chroma sub-blocks have a corresponding directional intra prediction mode:
the plurality of luma transform blocks is to be generated by splitting the plurality of encoded luma sub-blocks in accordance with a luma transform unit splitting that is based on a value of the luma transform parameter; and
the plurality of chroma transform blocks is to be generated by splitting the plurality of encoded chroma sub-blocks in accordance with a chroma transform unit splitting that is based on a value of the chroma transform parameter, wherein the luma transform unit splitting is different than the chroma transform unit splitting; and
when the luma partitioning tree is different than the chroma partitioning tree and the encoded chroma sub-blocks have a corresponding non-directional intra prediction mode, transform partitioning of the plurality of encoded chroma sub-blocks is prohibited.

15. The method of claim 14, wherein the bitstream further comprises a luma parameter indicating the luma partitioning tree and a chroma parameter indicating the chroma partitioning tree.

16. The method of claim 14, wherein the bitstream further comprises a luma parameter indicating how to partition a luma component of the current block, a first chroma parameter indicating how to partition a first chroma component of the current block, and a second chroma parameter indicating how to partition a second chroma component of the current block.

17. The method of claim 14, wherein the luma transform parameter indicates a transform partitioning structure for the plurality of encoded luma sub-blocks, and wherein the chroma transform parameter indicates a transform partitioning structure for the plurality of encoded chroma sub-blocks.

18. The method of claim 14, wherein the chroma transform parameter indicates a transform type from a set of allowed transform types for the plurality of encoded chroma sub-blocks.

19. The method of claim 14, wherein the luma partitioning tree and the chroma partitioning tree share a partial tree structure from a root node of a super block.

\* \* \* \* \*